United States Patent
Melink et al.

(10) Patent No.: US 11,543,164 B2
(45) Date of Patent: Jan. 3, 2023

(54) SUPER-HYBRID HEAT PUMP SYSTEM AND METHOD

(71) Applicant: Melink Solar & Geo, Inc., Milford, OH (US)

(72) Inventors: Stephen K. Melink, Cincinnati, OH (US); Stephen Hamstra, Zeeland, MI (US); Roshan Revankar, Los Gatos, CA (US)

(73) Assignee: Melink Solar & Geo, Inc., Milford, OH (US)

( * ) Notice: Subject to any disclaimer, the term of this patent is extended or adjusted under 35 U.S.C. 154(b) by 207 days.

(21) Appl. No.: 17/101,562

(22) Filed: Nov. 23, 2020

(65) Prior Publication Data

US 2021/0156601 A1 May 27, 2021

Related U.S. Application Data

(60) Provisional application No. 62/938,380, filed on Nov. 21, 2019.

(51) Int. Cl.
F25B 49/02 (2006.01)
F25B 13/00 (2006.01)

(52) U.S. Cl.
CPC .............. *F25B 49/02* (2013.01); *F25B 13/00* (2013.01)

(58) Field of Classification Search
CPC .................................. F25B 49/02; F25B 13/00
See application file for complete search history.

(56) References Cited

U.S. PATENT DOCUMENTS

| | | | |
|---|---|---|---|
| 4,192,146 A | 3/1980 | Credé | |
| 4,559,788 A | 12/1985 | McFarlan | |
| 6,324,860 B1 * | 12/2001 | Maeda | F24F 5/001 62/96 |
| 6,681,593 B1 | 1/2004 | Gundlach | |
| 9,016,079 B2 | 4/2015 | Pedersen | |
| 9,038,390 B1 * | 5/2015 | Kreuger | F03G 6/005 60/670 |
| 2011/0314856 A1 | 12/2011 | Willgohs | |
| 2014/0013783 A1 * | 1/2014 | Xiang | C02F 1/048 62/122 |
| 2015/0114019 A1 | 4/2015 | Van Gysel | |
| 2015/0191182 A1 * | 7/2015 | Abou Eid | F25B 47/022 62/335 |
| 2018/0120011 A1 | 5/2018 | Goldman | |
| 2018/0195809 A9 | 7/2018 | Cox et al. | |

(Continued)

FOREIGN PATENT DOCUMENTS

WO 2009123458 A1 10/2009

*Primary Examiner* — Henry T Crenshaw
(74) *Attorney, Agent, or Firm* — Taft Stettinius & Hollister LLP

(57) ABSTRACT

An exemplary heating, ventilation, and air conditioning (HVAC) system for a building includes a primary heat pump system having a primary heat pump system size, a secondary heat pump system having a secondary heat pump system size less than the primary heat pump system size, a thermal energy storage system, and a control system operable to control operation of the primary heat pump system and the secondary heat pump system. The control system may limit operation of the secondary heat pump system to a first time period, and operates the primary heat pump system according to demand of the building.

15 Claims, 8 Drawing Sheets

(56) References Cited

U.S. PATENT DOCUMENTS

| | | |
|---|---|---|
| 2018/0328633 A1 | 11/2018 | Jacobi |
| 2020/0088450 A1* | 3/2020 | Watson ................... F25B 27/02 |
| 2020/0393173 A1* | 12/2020 | Temple ................... F25B 41/22 |

* cited by examiner

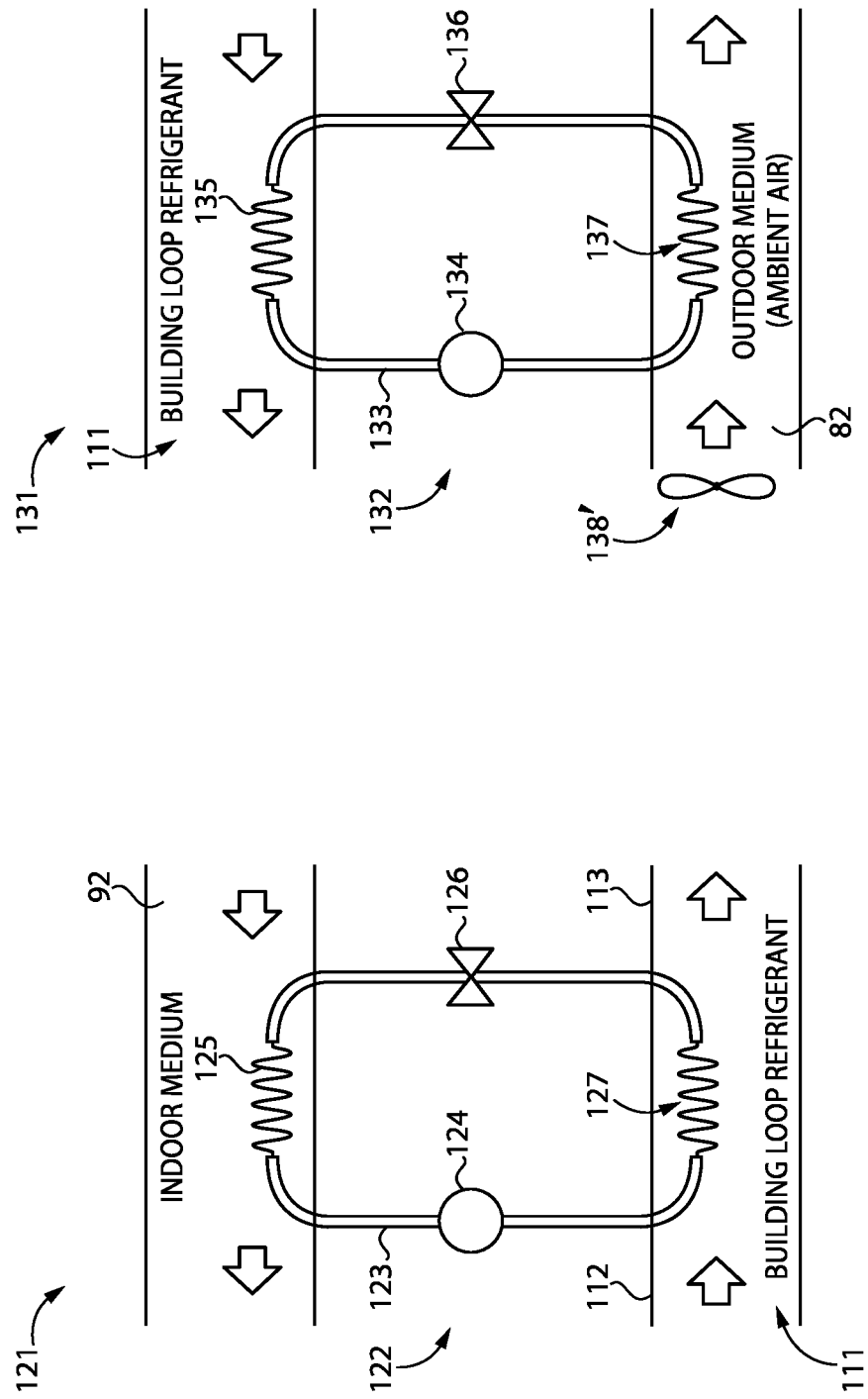

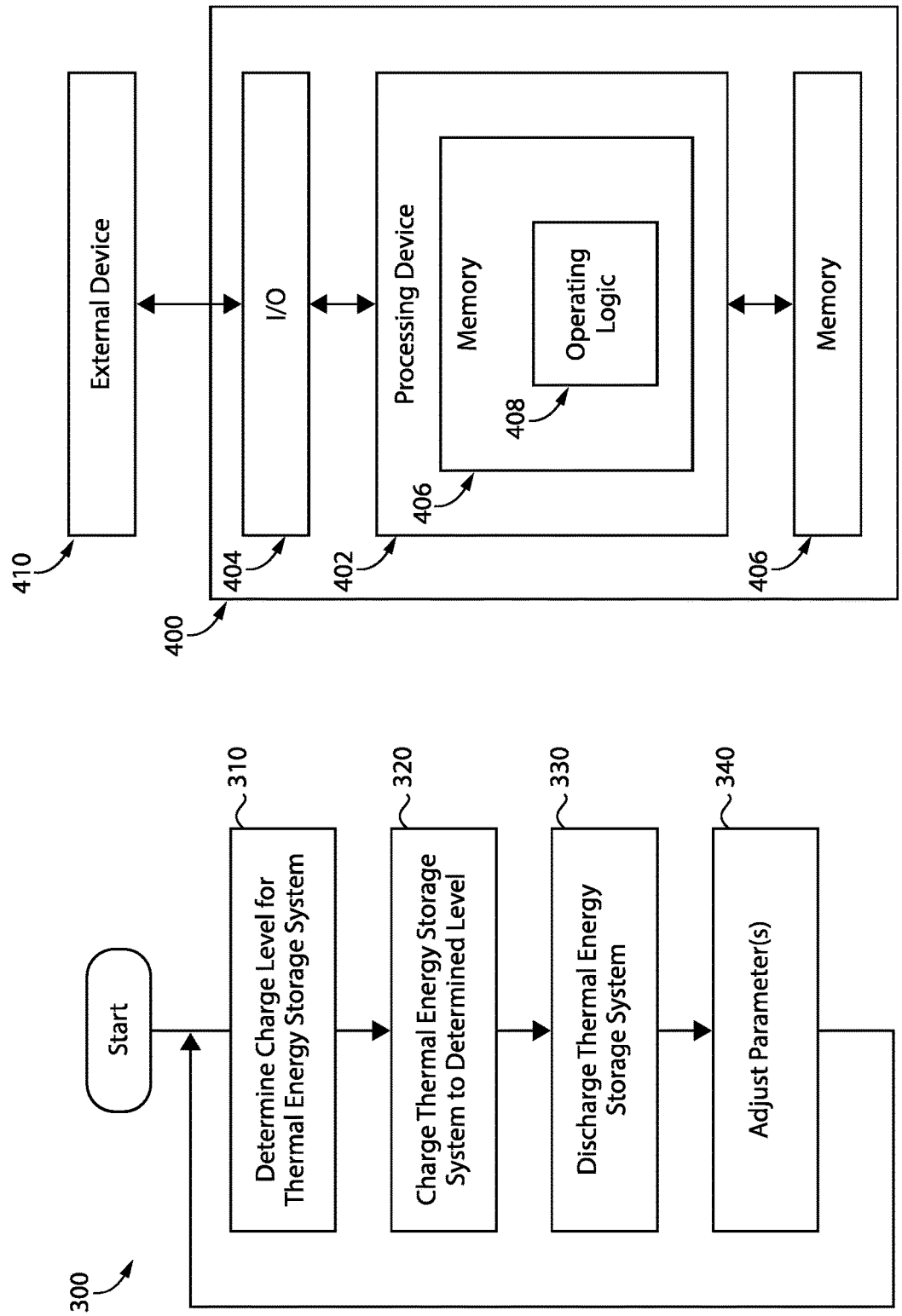

SUPER-HYBRID HEAT PUMP SYSTEM AND METHOD

CROSS-REFERENCE TO RELATED APPLICATIONS

The present application claims the benefit of US Provisional Patent Application No. 62/938,380, filed Nov. 21, 2019, the contents of which are incorporated by reference in their entirety.

TECHNICAL FIELD

The present disclosure generally relates to heat pump systems, and more particularly but not exclusively relates to heat pump systems for supplementing or obviating geothermal ground loops.

BACKGROUND

Geothermal heat pumps are widely considered the most energy-efficient method to heat and cool buildings, and are up to 25% to 50% more efficient than conventional heating ventilation and air conditioning (HVAC) systems. However, the first cost of installing the ground loop is a major market barrier. Drilling boreholes or excavating trenches for the ground loop can easily add 50-100% in cost over a conventional air-source heat pump or standard air conditioning unit with natural gas heating. Additionally, the ground conditions are not always conducive for drilling/trenching, or the space is not available. As a result, less than 5% of new construction and existing buildings use this type of system.

There is a growing need for more energy efficient HVAC systems to not only save building owners money, but also to reduce or eliminate their carbon footprint. Typically, HVAC systems represent a large portion of a typical building's energy load, and zero-energy buildings need to become the new standard within the next decade to mitigate the effects of global climate change.

Some designers and installers promote a "hybrid" geothermal system to reduce the size and cost of the ground loop up to 50% by incorporating a boiler and cooling tower. The idea is to utilize the ground loop for base load heating and cooling needs, and only turn on the boiler and cooling tower on peak load days. However, one problem with this approach is that the cost is often still too high for the geothermal heat pump industry to grow significantly. Moreover, using a fossil fuel such as natural gas for heating hot water and consuming water in an open loop system goes against some of the motivation for using geothermal in the first place. The world needs to move toward a carbon-free HVAC system for sustainability reasons.

Air-to-water heat pumps are relatively uncommon, and those that are manufactured are most commonly used for radiant floor systems rather than zone heat pumps on a geothermal facility loop. Although radiant floor systems can be highly efficient, they lack the ability to precisely control temperature across various zones in a building, and do not provide dehumidification or introduce outside air. In light of these drawbacks, such radiant floor systems are mainly used in homes rather than commercial buildings.

For the foregoing reasons among others, there remains a need for further improvements in this technological field.

SUMMARY

An exemplary heating, ventilation, and air conditioning (HVAC) system for a building includes a primary heat pump system having a primary heat pump system size, a secondary heat pump system having a secondary heat pump system size less than the primary heat pump system size, a thermal energy storage system, and a control system operable to control operation of the primary heat pump system and the secondary heat pump system. The control system operates the primary heat pump system according to demand of the building, and may limit operation of the secondary heat pump system to a first time period. Further embodiments, forms, features, and aspects of the present application shall become apparent from the description and figures provided herewith.

BRIEF DESCRIPTION OF THE FIGURES

FIG. 2 is a schematic representation of a primary heat pump according to certain embodiments.

FIG. 3 is a schematic representation of a secondary heat pump according to certain embodiments.

FIG. 8 is a schematic flow diagram of a process according to certain embodiments.

FIG. 9 is a schematic block diagram of a computing device that may be utilized in connection with certain embodiments.

DETAILED DESCRIPTION OF ILLUSTRATIVE EMBODIMENTS

Figure 1:
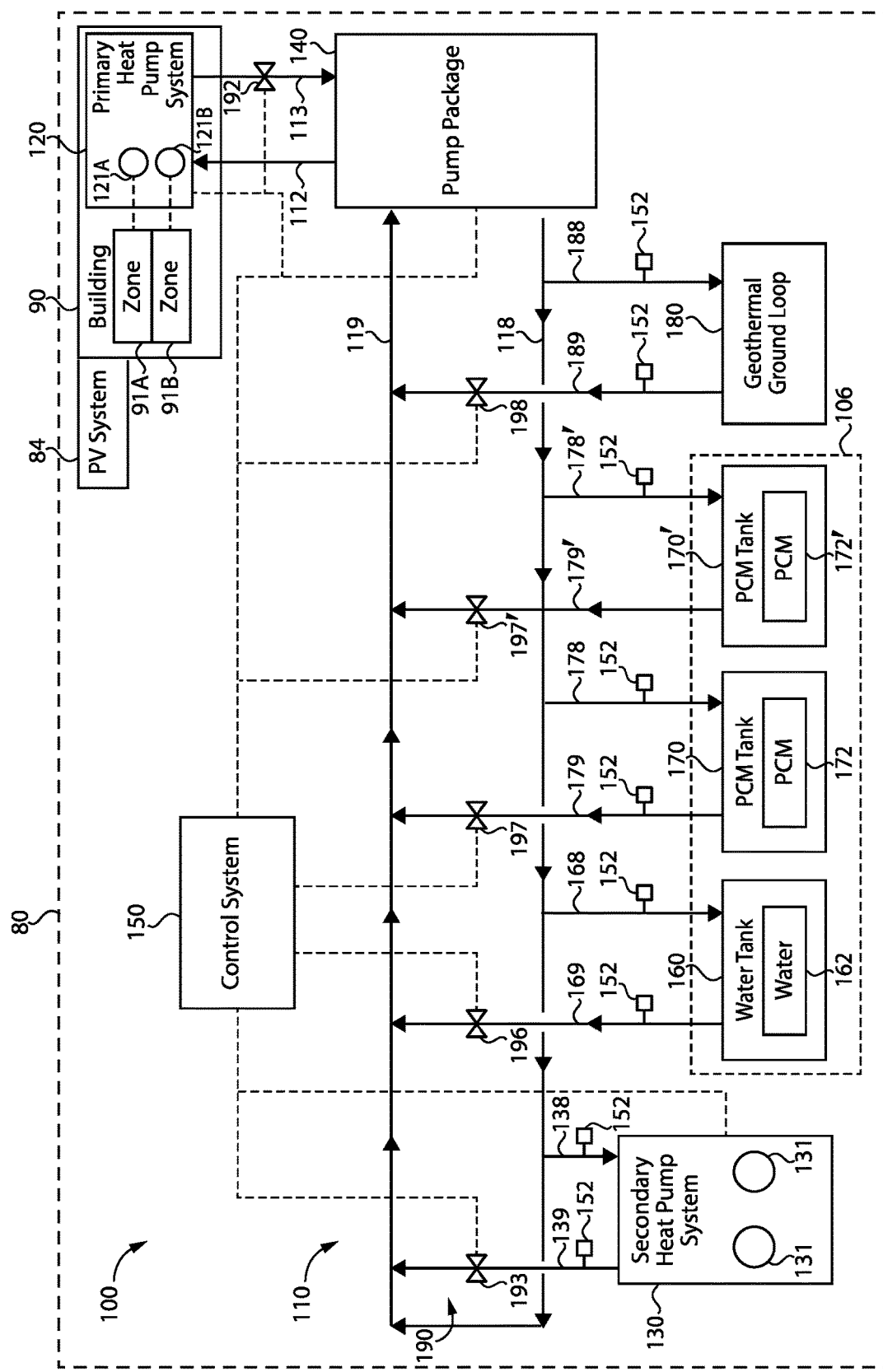
FIG. 1 is a schematic diagram of a system according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a super-hybrid HVAC system 100 according to certain embodiments, which may be utilized to heat and/or cool a load such as a building 90 located at a site 80. The system 100 generally includes a facility loop 110, a primary heat pump system 120 in thermal communication with the facility loop 110, a secondary heat pump system 130 in thermal communication with the facility loop 110, a pump package 140 that pumps refrigerant through the facility loop 110, and a control system 150 that controls operation of the HVAC system 100. The HVAC system 100 further includes a thermal energy storage system 106, which includes a water tank 160 and/or one or more phase change material (PCM) tanks 170, 170'. In certain embodiments, the system 100 further includes a bore field or geothermal ground loop 180. As described herein, a refrigerant such as water is pumped through the facility loop 110 such that heat is transferred between the building 90 and the environment by the system 100, and a valve system 190 aids the control system 150 in controlling the operation of the facility loop 110.

The facility loop 110 has a refrigerant 111 (FIG. 2) flowing therethrough, and in the illustrated form the refrigerant 111 comprises water. In certain embodiments, the refrigerant 111 may consist essentially of water, while in other embodiments the refrigerant 111 may further comprise an antifreeze agent such as glycol. The facility loop 110 includes a primary supply line 112 leading from the pump package 140 to the primary heat pump system 120, and a primary return line 113 leading from the primary heat pump system 120 to the pump package 140. The facility loop 110 further includes a secondary supply line 118 leading from the pump package 140 to the secondary heat pump system 130 and the thermal energy storage system 106 (and optionally to the geothermal ground loop 180), and a secondary return line 119 leading to the pump package 140 from the secondary heat pump system 130 and the thermal energy storage system 106 (and optionally from the geothermal ground loop 180).

With additional reference to FIG. 2, the primary heat pump system 120 includes one or more primary heat pumps 121, each of which includes a vapor-compression loop 122 through which a refrigerant 123 flows. Each vapor-compression loop 122 includes a compressor 124 that compresses the refrigerant 123, a first heat exchanger 125 that exchanges thermal energy between the refrigerant 123 and an indoor medium 92, an expander 126 that expands the refrigerant 123, and a second heat exchanger 127 that exchanges thermal energy between the heat pump refrigerant 123 and the facility loop refrigerant 111.

Each heat pump 121 is reversible such that the heat pump 121 is operable to cool the indoor medium 92 (by transferring thermal energy from the indoor medium 92 to the facility loop refrigerant 111) and is further operable to heat the indoor medium 92 (by transferring thermal energy from the facility loop refrigerant 111 to the indoor medium 92). The indoor medium 92 may, for example, be provided as air that is to be pumped into the building 90 or water that is to be utilized in the building 90, such as for radiant heating/cooling. In certain forms, one or more of the primary heat pumps 121 may be provided as a refrigerant-to-air heat pump or a water-to-air heat pump. In certain forms, one or more of the primary heat pumps 121 may be provided as a refrigerant-to-water heat pump or a water-to-water heat pump.

In certain embodiments, the primary heat pump system 120 includes plural primary heat pumps 121. For example, each primary heat pump 121 may correspond to a respective zone 91 of the building 90. In the illustrative example, the primary heat pump system 120 includes a first zone heat pump 121A that transfers thermal energy between the facility loop 110 and a first building zone 91A, and a second zone heat pump 121B that transfers thermal energy between the facility loop 110 and a second building zone 91B. As described herein, the primary heat pump system 120 may be sized according to the heating/cooling load of the building 90 such that the primary heat pump system 120 is operable to satisfy the heating/cooling demand of the building 90. For example, each primary heat pump 121 may be sized according to the demand of the corresponding zone 91, and the size of the primary heat pump system 120 may be provided as the sum of the sizes of all primary heat pumps 121 included in the primary heat pump system 120. Those skilled in the art will readily appreciate that the "size" of a heat pump or heat pump system refers not to its physical size, but rather to its heating/cooling capacity, which may, for example, be expressed in tons.

With additional reference to FIG. 3, the secondary heat pump system 130 includes one or more secondary heat pumps 131, each of which includes a vapor-compression loop 132 through which a refrigerant 133 flows. Each vapor-compression loop 132 includes a compressor 134 that compresses the refrigerant 133, a first heat exchanger 135 that transfers thermal energy between the heat pump loop refrigerant 133 and the facility loop refrigerant 111, an expander 136 that expands the refrigerant 133, and a second heat exchanger 137 that transfers thermal energy between the heat pump refrigerant 133 and an outdoor medium 82 (e.g., ambient air). The secondary heat pump system 130 may further include a fan or blower 138' that blows the outdoor air 82 over the second heat exchanger 137 to increase the rate of thermal energy transfer between the outdoor medium 82 and the refrigerant 133.

Each heat pump 131 is reversible such that the heat pump 131 is operable to cool the facility loop refrigerant (by transferring thermal energy from the facility loop refrigerant 111 to the outdoor medium 82) and is further operable to heat the facility loop refrigerant 111 (by transferring thermal energy from the outdoor medium 82 to the facility loop refrigerant 111). In the illustrated form, each of the secondary heat pumps 131 is provided as an air-to-water (ATW) heat pump, and the secondary heat pump system 130 may alternatively be referred to as the ATW heat pump system 130. In other forms, one or more of the secondary heat pumps 131 may be provided as another form of air-source heat pump, or as a water-source heat pump.

The secondary heat pump system 130 is in fluid communication with the supply line 128 via a secondary heat pump system supply line 138, and is in fluid communication with the return line 129 via a secondary heat pump system return line 139. In certain embodiments, the ATW heat pump(s) 131 may be fluidly isolated from the loop lines 118, 119 by the heat exchanger 135. In other embodiments, the ATW heat pump(s) 131 may be fluidly integrated with the facility loop 110, for example in embodiments in which the refrigerant of the facility loop 110 is provided as or comprises water.

Figure 4:
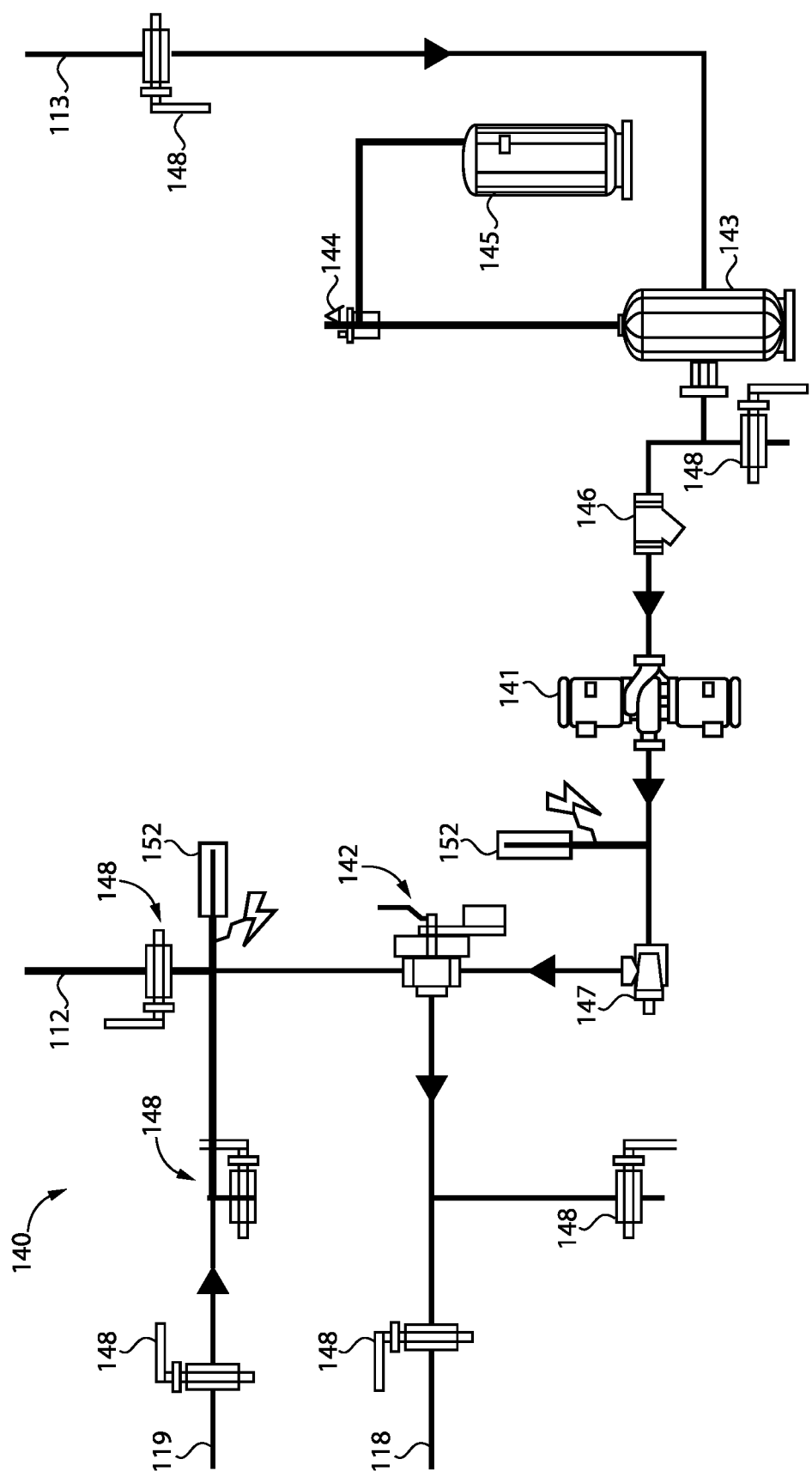
FIG. 4 is a schematic representation of a pump package according to certain embodiments.

With additional reference to FIG. 4, the pump package 140 pumps the refrigerant 111 through the facility loop 110 such that the primary heat pump system 120 is operable to transfer thermal energy between the refrigerant 111 and the indoor medium 92, the secondary heat pump system 130 is operable to transfer thermal energy between the refrigerant 111 and the outdoor medium 82, and the thermal energy storage system 106 is operable to accept or reject thermal energy as needed. The pump package 140 generally includes a fluid pump 141 that acts as a prime mover for the facility loop refrigerant 111 and a three-way valve 142 that selectively directs refrigerant 111 from the fluid pump 141 to the primary supply line 112 and/or the secondary supply line 118.

The pump package 140 may further include one or more additional features that aid in pumping the refrigerant 111 to the supply lines 112, 118 and/or from the return lines 113, 119. For example, an air separator 143 may separate air from the refrigerant 111 prior to the refrigerant being directed to the fluid pump 141, and elimination of such air may be facilitated by an air elimination valve 144 and/or an expansion tank 145. A strainer 146 may strain the refrigerant 111 prior to entry of the refrigerant 111 into the fluid pump 141, and the refrigerant 111 may flow through a combination check/isolation/balancing valve 147 (such as a Flo-Trex valve) upon exiting the fluid pump 141. One or more purge ports 148 may facilitate purging of the refrigerant 111, and one or more temperature sensors 152 may be provided to monitor the temperature of the refrigerant at various locations within the pump package 140.

Figure 5:
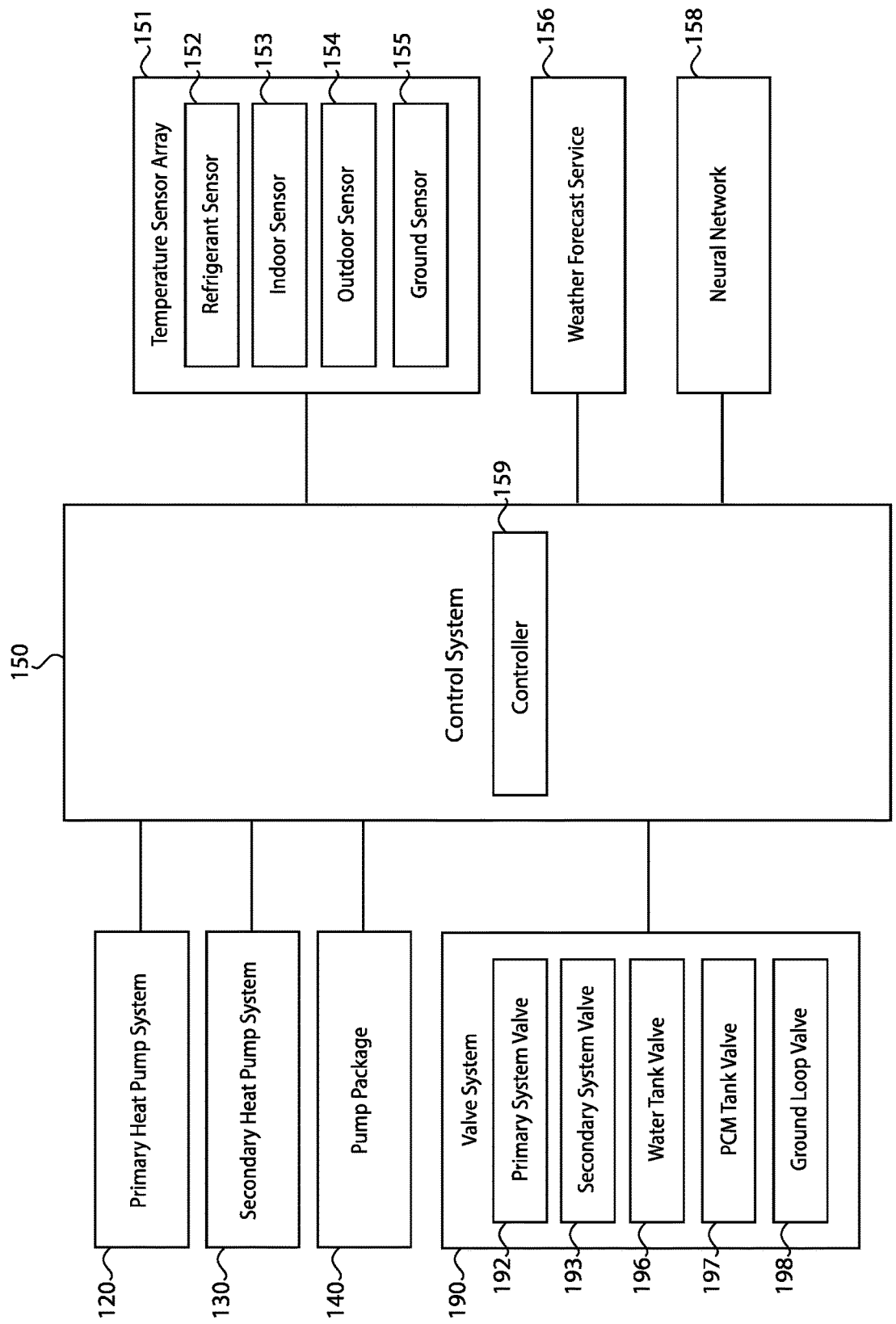
FIG. 5 is a schematic block diagram of a portion of the system illustrated in FIG. 1.

With additional reference to FIG. 5, the control system 150 is configured to control the flow of refrigerant 111 through the facility loop 110, and includes a controller 159 operable to perform one or more of the tasks described herein. The control system 150 is in communication with the primary heat pump system 120, the secondary heat pump system 130, the pump package 140, and the valve system 190. The control system 150 may further be in communication with a temperature sensor array 151 including one or more refrigerant temperature sensors 152 such that the control system 150 is operable to make control decisions based at least in part upon information regarding the temperature of the refrigerant 111 at one or more points along the facility loop 110. The sensor array 151 may additionally or alternatively include one or more indoor temperature sensors 153 and/or one or more outdoor temperature sensors 154 such that the control system 150 is operable to make control decisions based at least in part upon information regarding the temperature within the building 90 and/or the temperature of the ambient environment (e.g., of the outdoor medium 82). In embodiments in which the system 100 includes a ground loop 180, the temperature sensor array 151 may further include a ground temperature sensor 155 that senses the temperature of the earth in which the ground loop 180 is buried such that the control system 150 is operable to make decisions based at least in part upon such information. The control system 150 may further be in communication with a weather forecast service 156 such that the control system 150 is operable to make control decisions based in part upon a weather forecast. The control system 150 may additionally or alternatively include or be in communication with an artificial neural network 158 by which the operation of the control system 150 can be improved or optimized via machine learning. Further details regarding example control algorithms, strategies, and methods that may be utilized by the control system 150 are provided herein.

Figure 6:
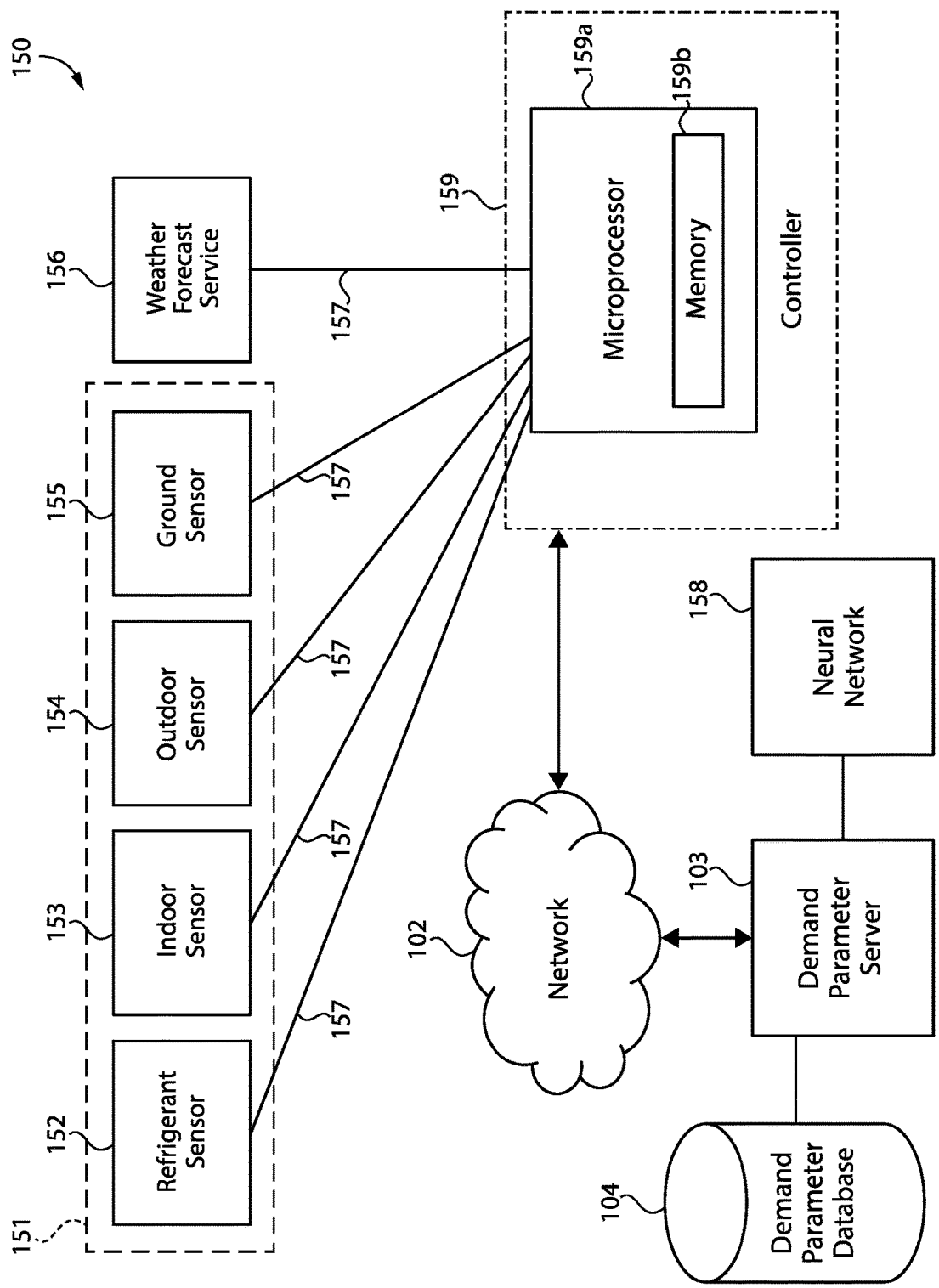
FIG. 6 is a schematic block diagram of a control system according to certain embodiments.

With additional reference to FIG. 6, illustrated therein is a block diagram of the super-hybrid HVAC control configuration 150. The controller 159 may include a microprocessor 159a and memory 159b. Further details regarding an example form of the controller 159 are provided below with reference to FIG. 9. In the illustrated form, the controller 159 monitors various demand parameters associated with the building 90 required to maintain the building within a temperature threshold. The controller 159 may then automatically activate graduated actions to be executed by different components of the super-hybrid HVAC system 100 in response to the monitored demand parameters. In doing so, the controller 159 may continuously monitor the demand parameters and activate graduated actions to be executed by different components of the super-hybrid HVAC system 100 in real-time when necessary to maintain the demand parameters within their corresponding demand parameter thresholds to maintain the temperature of the building within a temperature threshold. The super-hybrid HVAC control configuration 150 shares many similar features with the super-hybrid HVAC system 100 and the control system 150; therefore, only the differences between the super-hybrid HVAC control configuration 150 and the super-hybrid HVAC system 100, and the control system 150 are to be discussed in further detail.

In certain embodiments, the controller 159 may connect and/or communicate via wireless communication 157 to one or more modules such that when commands are received by the controller 159, a graduated action is activated based on the monitoring of demand parameters of different sensors to maintain the demand parameters within the corresponding demand parameter thresholds to maintain the temperature of the building 90 within the temperature threshold. The one or modules of the super-hybrid HVAC control configuration 150 include the refrigerant sensor 152, the indoor sensor 153, outdoor sensor 154, the ground sensor 155, the weather forecast service 156, and/or any other module that may be controlled and/or accessed by the controller 159 to ensure the temperature of the building 110 is maintained within the temperature threshold that will be apparent to those skilled in the relevant art(s) without departing from the spirit and scope of the disclosure.

The controller 159 includes a microprocessor 159a and a memory 159b and may be referred to as computing device or simply "computer". For example, the controller 159 may be a workstation, mobile device, computer, cluster of computers, remote cloud service, set-top box, or other computing device. In one embodiment of the present invention, multiple modules may be implemented on the same computing device. Such a computing device may include software, firmware, hardware, or a combination thereof. Software may include one or more applications on an operating system. Hardware can include, but is not limited to, the microprocessor 159a and/or the memory 159b. The controller 159 may be in wireless communication 157 with each of the refrigerant sensor 152, the indoor sensor 153, the outdoor sensor 154, the ground sensor 155, and the weather forecast service 156

The controller 159 as well as any other controller associated with any other building may continuously stream demand parameter data to the demand parameter server 103 that is stored in the demand parameter database 104. In doing so, the demand parameter database 104 may continuously accumulate demand parameter data that is associated with automatic adjustments of many different demand parameters to many different controllers maintaining the temperature within the temperature threshold for many buildings 90. Over time as the demand parameter data is accumulated by the demand parameter server 103 continues to increase, the neural network 158 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

Each time the demand parameter data is streamed to demand parameter server 103 and stored in the demand parameter database 104, the neural network 158 may then assist the controller 159 by providing the controller 159 with the appropriate adjustments with regard to the appropriate demand parameters to automatically adjust the different components of the super-hybrid HVAC system 100 to head off any increase and/or decrease of the temperature of the building 90 that may deviate beyond the temperature threshold of the building 90. The neural network 158 may assist the controller 159 in learning as to the appropriate actions to execute based that the building 90 is experiencing such that the neural network 158 may further improve the accuracy of the controller 159 in automatically adjusting different components of the super-hybrid HVAC system 100 to further enhance the temperature efficiency of the building 90 in real-time. The neural network 158 may provide the controller 159 with improved accuracy upon automatically adjusting the appropriate components of the super-hybrid HVAC system 100 such that the neural network 158 may continue to learn upon the accumulation of demand parameters that is provided by the controller 159 and/or any other controller associated with any other building to the demand parameter server 103. Thus, the efficiency of the building 90 is further enhanced.

The water tank 160 stores water 162, which may be utilized as a thermal energy storage medium in certain embodiments. The water tank 160 is in fluid communication with the supply line 128 via a water tank supply line 168, and is in fluid communication with the return line 129 via a water tank return line 169. In certain embodiments, such as those in which the refrigerant utilized in the facility loop 110 is water, the water tank 160 may be in direct fluid communication with the facility loop 110 such that the supply line 168 empties into the water tank 160 and the water tank 160 discharges stored water 162 to the return line 169. In other embodiments, the water 162 stored in the tank 160 may be fluidly isolated from the supply line 168 and the return line 169. For example, the refrigerant 111 of the facility loop 110 may flow through one or more heat exchangers disposed within the water tank 160 such that thermal energy is transferred between the facility loop refrigerant 111 and the stored water 162.

The first PCM tank 170 stores a first phase change material 172, which may be utilized as a thermal energy storage medium in certain embodiments. The first PCM tank 170 is in fluid communication with the supply line 128 via a first PCM tank supply line 178, and is in fluid communication with the return line 129 via a first PCM tank return line 179. In certain embodiments, the first PCM 172 stored in the first tank 170 may be fluidly isolated from the supply line 178 and the return line 179. For example, the refrigerant 111 of the facility loop 110 may flow through one or more heat exchangers disposed within the first PCM tank 170 such that thermal energy is transferred between the refrigerant and the first PCM 172. The first PCM 172 is configured to change phases (e.g., between solid and liquid phases) at a first designated phase change temperature when exposed to atmospheric pressure. While other temperature ranges are contemplated, the first designated phase change temperature for the PCM 172 may be between 40° F. and 100° F., or between 50° F. and 80° F. The first PCM 172 may, for example, take the form of a paraffin, a lipid, a salt hydrate, or another form of phase change material.

As described herein, the PCM tank 170 may be "charged" during off-peak hours when utility costs are lower, and "discharged" during peak hours when utility costs are higher. As used herein, each of the terms "charging" and "discharging" can involve storing thermal energy in the PCM 172 or removing thermal energy from the PCM 172, depending upon whether the PCM 172 is intended to be used as a heat source or a heat sink during peak hours. More particularly, in circumstances in which the PCM 172 is intended to be utilized as a heat source during peak hours, charging the PCM 172 involves storing thermal energy in the PCM 172 to thereby melt at least a portion of the PCM 172, and discharging the PCM 172 involves transferring thermal energy from the PCM 172 to thereby freeze at least a portion of the PCM 172. Conversely, in circumstances in which the PCM 172 is intended to be utilized as a heat sink during peak hours, charging the PCM 172 involves transferring thermal energy from the PCM 172 to thereby freeze at least a portion of the PCM 172, and discharging the PCM 172 involves transferring thermal energy to the PCM 172 to thereby melt at least a portion of the PCM 172.

In certain embodiments, the thermal energy storage system 106 may further include a second PCM tank 170' storing a second PCM 172'. In such forms, the second PCM tank 172' may be in fluid communication with the supply line 128 via a second PCM tank supply line 178', and may be in fluid communication with the return line 129 via a second PCM tank return line 179'. In certain embodiments, the second PCM 172 stored in the second tank 170 may be fluidly isolated from the supply line 178' and the return line 179'. For example, the refrigerant 111 of the facility loop 110 may flow through one or more heat exchangers disposed within the second PCM tank 170' such that thermal energy is transferred between the refrigerant and the second PCM 172'. The second PCM 172' is configured to change phases (e.g., between solid and liquid phases) at a second designated phase change temperature when exposed to atmospheric pressure. The second PCM 172' may, for example, take the form of a paraffin, a lipid, a salt hydrate, or another form of phase change material. Those skilled in the art will readily recognize that charging and discharging the second PCM 172' may occur in a manner analogous to that described with the charging and discharging of the first PCM 172.

As noted above, each PCM 172, 172' is configured to change phases at a corresponding and respective designated phase change temperature. In certain embodiments, the first designated phase change temperature and the second designated phase change temperature are different temperatures. For example, the designated phase change temperature for the first PCM 172 may be between 40° F. and 50° F., and the designated phase change temperature for the second PCM 172' may be between 100° F. and 120° F. In embodiments in which the PCMs 172, 172' have different designated phase change temperatures, the PCM 172/172' with the lower phase change temperature may be referred to herein as the "cold" PCM, and the PCM 172/172' with the higher phase change temperature may be referred to herein as the "hot" PCM. For ease and convenience of description, the first PCM tank 170 and the first PCM 172 may be respectively referred to herein as the cold PCM tank 170 and the cold PCM 172, and the second PCM tank 170' and the second PCM 172' may respectively be referred to herein as the hot PCM tank 170' and the hot PCM 172'. It is also contemplated that the system 100 may include an intermediate PCM tank housing an intermediate PCM, such as one with a freeze/melt point between 60° F. and 65° F. As described herein, the different phase change temperatures of the various PCMs 172, 172' may be used to advantage in the system 100.

In certain embodiments, the system 100 may include a tertiary heat pump system configured to transfer thermal energy between the first PCM 172 and the second PCM 172'. For example, in embodiments in which the first PCM 172 is a cold PCM and the second PCM 172' is a hot PCM, such a tertiary heat pump system may serve to transfer heat from the cold PCM 172 to the hot PCM 172' to simultaneously charge both PCMs 172, 172'.

The bore field or geothermal ground loop 180 generally includes one or more pipes that are buried within the ground such that a refrigerant flowing through the pipes transfers thermal energy with the earth. The ground loop 180 is in fluid communication with the supply line 128 via a ground loop supply line 188, and is in fluid communication with the return line 129 via a ground loop return line 189. In certain embodiments, such as those in which the refrigerant used in the ground loop 180 is the same as the refrigerant used in the facility loop 110 (e.g., water), the ground loop 180 may be in direct fluid communication with the facility loop 110 such that the supply line 188 empties into the pipes of the ground loop 180 and the pipes of the ground loop 180 discharge refrigerant to the return line 189. In other embodiments, the ground loop 180 may be fluidly isolated from the facility loop 110, for example by a water-refrigerant heat pump that transfers thermal energy between the ground loop 180 and the facility loop refrigerant 111.

The valve system 190 facilitates control of the facility loop 110 by the control system 150, and generally includes one or more valves. The valve system 190 may include one or more of a primary heat pump system valve 192, secondary heat pump system valve 193, a water tank valve 196, a first PCM tank valve 197, a second PCM tank valve 197', or a ground loop valve 198, each of which may selectively permit flow of the refrigerant 111 to and/or from the corresponding subsystem. For example, the primary heat pump system valve 192 may control the flow of facility loop refrigerant 111 through the primary heat pump system return line 113, the secondary heat pump system valve 193 may control the flow of facility loop refrigerant 111 through the secondary heat pump system return line 139, and the water tank valve 196 may control the flow of facility loop refrigerant 111 through the water tank return line 169. Similarly, each PCM tank valve 197, 197' may control the flow of facility loop refrigerant 111 through the corresponding PCM tank return line 179, 179' and the ground loop valve 198 may control the flow of facility loop refrigerant 111 through the ground loop return line 189. While each of the valves 192, 193, 196, 197, 197' 198 is illustrated as being disposed on a corresponding one of the return lines 113, 139, 169, 179, 179', 189, it is also contemplated that additional or alternative valves may be disposed on the supply lines 112, 138, 168, 178, 178', 188. In certain forms, one or more of the valves may be provided as on/off valves that simply open and close the corresponding line. In certain forms, one or more of the valves may be provided as adjustable valves operable to adjust and control the flowrate of facility loop refrigerant 111 through the corresponding line.

Figure 7:
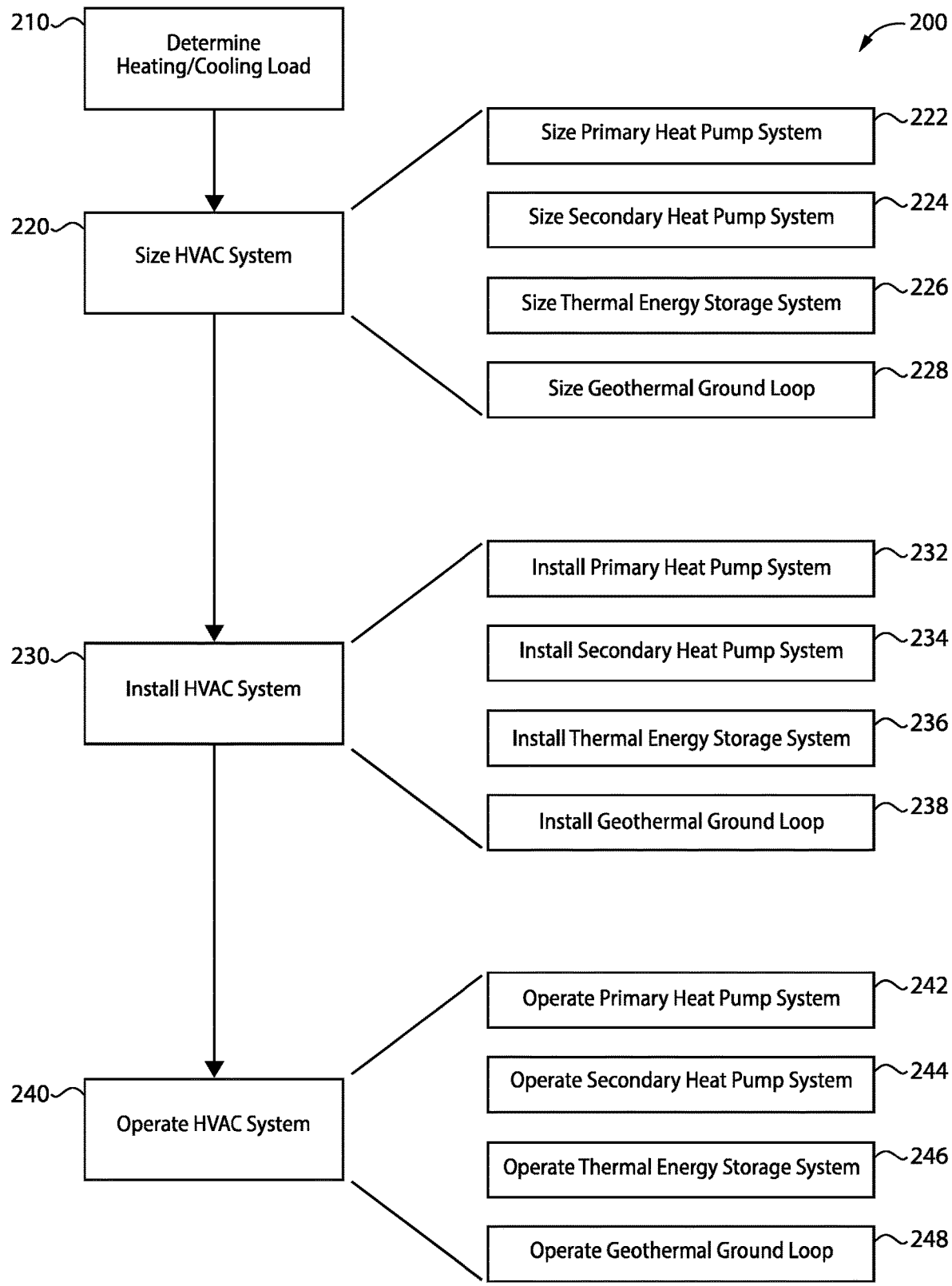
FIG. 7 is a schematic flow diagram of a process according to certain embodiments.

With additional reference to FIG. 7, an exemplary process 200 that may be performed using the example HVAC system 100 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 200 may be performed wholly by engineers, building designers, construction/installation personnel, and/or the control system 150, or that the blocks may be distributed among one or more of the elements and/or additional devices, parties, and/or systems that are not specifically illustrated in FIGS. 1-6. Additionally, while the blocks are illustrated in a relatively serial fashion, it is to be understood that two or more of the blocks may be performed concurrently or in parallel with one another.

The process 200 generally involves determining a heating/cooling load for a building, sizing an HVAC system, installing the HVAC system, and operating the HVAC system. More particularly, the illustrated process 200 includes determining the heating/cooling load for the building 90 in block 210, sizing the HVAC system 100 in block 220, installing the HVAC system 100 in block 230, and operating the HVAC system 100 in block 240. Further details regarding each of the blocks are provided herein. While the illustrated blocks 210, 220, 230, 240, are illustrated as being part of a single process 200, it should be understood that each of the blocks 210, 220, 230, 240 may be performed as a standalone process.

The process 200 may include block 210, which generally involves determining the heating/cooling load for a building 90 at a site 80. In certain embodiments, block 210 may involve determining the heating/cooling load on an hourly basis. Block 210 may involve determining the heating/cooling load for the building 90 based upon a number of factors, including but not limited to planned occupancy of the building 90, volume of the building 90, latitude of the site 80, climatic conditions, tree cover, orientation of the building 90 relative to the sun, the number and type of windows in the building 90, the estimated heat load from equipment within the building 90 (e.g., lights, computers, machinery, etc.), and other factors. In certain embodiments, block 210 may include determining the heating/cooling load for particular zones of the building 90, such as the zones 91A, 91B. Methods for calculating the heating/cooling loads of buildings and zones thereof are known in the art, and need not be described in detail herein.

In certain embodiments, block 210 may involve determining a base heating/cooling load and a peak heating/cooling load. For example, block 210 may involve determining the base heating/cooling load based on typical summer and winter loads in the particular region in which the facility will be installed. For example, in a relatively temperate region, the base cooling load may be determined based upon a projected outdoor temperature of 90° F., and the base heating load may be determined based upon a projected outdoor temperature of 20° F. Block 210 may further involve determining the peak heating/cooling loads based upon expected extremes for the region, such as based on historical high and low temperatures for that region.

The process 200 may include block 220, which generally involves sizing the HVAC system 100 based upon the heating/cooling load for the building 90. As described herein, block 220 generally involves sizing the primary heat pump system 120 in block 222, sizing the secondary heat pump system 130 in block 224, and sizing the thermal energy storage system 106 in block 226, and in certain embodiments further includes sizing the geothermal ground loop 180 in block 228. While not specifically illustrated in FIG. 6, it is to be appreciated that block 220 may include sizing and/or selecting various other components of the HVAC system 100. For example, block 220 may further involve sizing the pump package 140, which may involve selecting a size for the pump 141 that enables the pump 141 to circulate the refrigerant 111 at a volumetric flow rate sufficient to provide the other subsystems with the appropriate amount of refrigerant 111. Similarly, the valves 190 and temperature sensors 151 may be sized and/or selected based upon the needs of the system 100.

Block 220 includes block 222, which generally involves sizing the primary heat pump system 120 based upon to the heating/cooling load for the building 90. Sizing the primary heat pump system 120 may include selecting a primary heat pump system size corresponding to the peak heating/cooling load for the building 90. For example, if the expected peak heating/cooling load is 47 tons, block 222 may involve sizing the primary heat pump system 120 at 50 tons. In certain embodiments, block 222 may involve sizing one or more primary heat pumps 121 based upon the heating/cooling load for the corresponding zone 91. For example, if a first zone 91A has a load of 18 tons and a second zone 91B has a load of 29 tons, block 222 may involve sizing a first zone heat pump 121A at 20 tons and sizing a second zone heat pump 121B at 30 tons.

Block 220 further includes block 224, which generally involves sizing the secondary heat pump system 130 based upon the heating/cooling load for the building 90. More particularly, sizing the secondary heat pump system 130 in block 224 involves selecting a secondary heat pump system size less than the peak heating/cooling load for the building 90 and/or less than the size selected for the primary heat pump system 120. In certain embodiments, block 224 may involve selecting the size of the secondary heat pump system 130 as corresponding to a percentage of the heating/cooling load for the building 90. For example, block 224 may involve selecting the secondary heat pump system size as between one fifth and one third of the overall heating/cooling load for the building 90. As other examples, block 224 may involve selecting the secondary heat pump system size as no greater than one half the size selected for the primary heat pump system 120, or as 40% or less of the primary heat pump system size and/or the estimated heating/cooling load for the building 90.

Block 220 further includes block 226, which generally involves sizing the thermal energy storage system 106, for example based upon the heating/cooling load for the building. In certain embodiments, the thermal energy storage system 106 may be sized as a fixed ratio relative to the heating/cooling load, (e.g., a predetermined number of ton-hours per ton of load). In certain embodiments, the thermal energy storage system 106 may be sized based on the selected size for the primary heat pump system 120 and/or the selected size for the secondary heat pump system 130, or based on the difference in the sizes selected for the primary and secondary heat pump systems 120, 130. In certain embodiments, block 226 may involve sizing the thermal energy storage system 106 such that the thermal energy storage system 106 is able to handle the base loads during the day and recharge during the nighttime hours during summer operation. During the winter, it may be more advantageous to recharge during the day when outside temperatures are higher, or to recharge during the night using electric heaters so as not to exceed a certain demand threshold during the day.

In certain embodiments, the goal of block 226 may be to size the thermal energy storage system 106 so that it can handle the peak loads so that auxiliary equipment or sinks/sources (e.g., the ground loop 180) are not necessary. While there are a plethora of possibilities for the sizing of the thermal energy storage system 106, the optimal sizing may depend on the cost of the various options at any point in time. For example, the thermal energy storage system 106 might be more cost-effective than battery storage but less cost effective than simply upsizing the air-water heat pump and running it for longer, and these options in turn may need to be compared to their respective operating costs.

Block 220 may further include block 228, which generally involves sizing the geothermal ground loop 180 based upon the heating/cooling load for the building 90 and/or the size of the secondary heat pump system 130. For example, block 228 may involve sizing the geothermal ground loop 180 to supplement the secondary heat pump system 130 for peak load conditions only. Peak load days are relatively infrequent, and so the size of the ground loop 180 can usually be limited to just 10% to 20% of the overall building load. In certain embodiments, block 228 may involve selecting the geothermal ground loop size based upon a difference between the base load conditions and peak load conditions. For example, if base load conditions are 20 tons and peak load conditions are 25 tons, block 224 may involve selecting the size of the secondary heat pump system 130 as 20 tons, and block 228 may involve selecting the size of the geothermal ground loop 180 as 5 tons.

The process 200 may include block 230, which generally involves installing the HVAC system 100 to the site 80. As described herein, block 230 generally involves installing the primary heat pump system 120 in block 232, installing the secondary heat pump system 130 in block 234, installing the thermal energy storage system 106 in block 236, and in certain embodiments further includes installing the geothermal ground loop 180 in block 238. While not specifically illustrated in FIG. 7, it is to be appreciated that block 230 may further include installing various other components of the system 100, such as the various lines of the facility loop 110, the pump package 140, the control system 150, and wiring and/or wireless communication connections connecting the control system 150 with the components that are to be placed in communication with the control system 150.

Block 230 includes block 232, which generally involves installing the primary heat pump system 120. Block 232 may, for example, involve placing each of the primary heat pumps 121 in thermal communication with the indoor medium 92 and the facility loop refrigerant 111 such that the primary heat pumps 121 are operable to transfer thermal energy between the indoor medium 92 and the facility loop refrigerant 111. In embodiments in which the primary heat pumps 121 are provided as zone heat pumps 121A, 121B, block 232 may involve placing the first heat exchanger 125 of the first zone heat pump 121A in thermal communication with a conduit leading to the first zone 91A, and placing the first heat exchanger 125 of the second zone heat pump 121B in thermal communication with a conduit leading to the second zone 91B.

Block 230 further includes block 234, which generally involves installing the secondary heat pump system 130. Block 234 may, for example, involve placing each of the secondary heat pumps 131 in thermal communication with the outdoor medium 82 and the facility loop refrigerant 111 such that the secondary heat pumps 131 are operable to transfer thermal energy between the outdoor medium 82 and the facility loop refrigerant 111. In certain embodiments, one or more of the secondary heat pumps 131 may include an outdoor unit including the second heat exchanger 137 and the blower 138', and block 234 may involve installing the outdoor unit to an outdoor area of the site 80 (e.g., the roof of the building 90). In certain embodiments, one or more of the secondary heat pumps 131 may include an indoor unit including the compressor 134 and the first heat exchanger 135, and block 234 may involve installing the indoor unit within the building 90.

Block 230 further includes block 236, which generally involves installing the thermal energy storage system 106. In certain embodiments, block 236 involves installing one or more water tanks 160 and filling the tank(s) with water 162. In certain embodiments, block 236 involves installing one or more PCM tanks 170 and filling the PCM tank(s) 170, 170' with PCM 172, 172'. Block 236 further involves placing the thermal energy storage medium (e.g., water 162 and/or PCM 172, 172') in thermal communication with the facility loop 110 such that thermal energy can be transferred between the facility loop refrigerant 111 and the thermal energy storage medium (e.g., water 162 or PCM 172). In certain embodiments, such as those in which the facility loop refrigerant 111 is provided as water, block 236 may involve placing the water tank 160 in fluid communication with the facility loop 110 such that the water supply line 168 discharges into the tank 160 and the tank 160 discharges to the water return line 169.

In certain embodiments, block 230 further includes block 238, which generally involves installing the geothermal ground loop 180. In such forms, block 238 generally involves installing the ground loop 180 in earth and placing the ground loop 180 in thermal communication with the facility loop 110 such that thermal energy can be transferred between the facility loop refrigerant 111 and the earth.

The process 200 may include block 240, which generally involves operating the HVAC system 100. Block 240 generally includes operating the primary heat pump system 120 in block 242, operating the secondary heat pump system 130 in block 244, and operating the thermal energy storage system 106 in block 246, and may further include operating the geothermal ground loop 180 in block 248. Block 240 may, for example, be performed at least in part by the control system 150. While not specifically illustrated in FIG. 7, it is to be appreciated that block 240 may further include operating various other components of the system 100, such as the pump package 140 and the valve system 190, and that the illustrated blocks may involve operation of such other components.

Block 240 includes block 242, which generally involves operating the primary heat pump system 120. As will be appreciated, operating the primary heat pump system 120 transfers thermal energy between the indoor medium 92 and the facility loop refrigerant 111, thereby heating or cooling the indoor medium 92 while cooling or heating the facility loop refrigerant 111. Block 242 may, for example, involve operating the primary heat pump system 120 according to demand of the building 90.

Block 240 further includes block 244, which generally involves operating the secondary heat pump system 130. As will be appreciated, operating the secondary heat pump system 130 transfers thermal energy between the outdoor medium 82 and the facility loop refrigerant 111, thereby heating or cooling the facility loop refrigerant 111 while cooling or heating the outdoor medium 82. As should also be appreciated, the addition/removal of thermal energy in block 244 serves to counteract the addition/removal of thermal energy in block 242. For example, on days in which block 242 involves operating the primary heat pump system 120 to primarily cool the indoor medium 92 (thereby heating the refrigerant 111), block 244 generally involves operating the secondary heat pump system 130 to cool the refrigerant 111. Conversely, on days in which block 242 involves operating the primary heat pump system 120 to primarily heat the indoor medium 92 (thereby cooling the refrigerant 111), block 244 generally involves operating the secondary heat pump system 130 to heat the refrigerant 111. As described herein, in certain embodiments, block 244 may involve limiting operation of the secondary heat pump system 130 to a first timeframe. In certain embodiments, the first timeframe corresponds to off-peak hours (i.e., those in which demand charges from the utility company are reduced, such as nighttime and weekend hours). In certain embodiments, the first timeframe is a timeframe in which the efficiency of the secondary heat pump system 130 is optimized.

Block 240 further involves block 246, which generally involves operating the thermal energy storage system 106 to transfer thermal energy between the facility loop refrigerant 111 and the thermal energy storage medium (e.g., water 162 and/or PCM 172 and/or PCM 172'). For example, during the cooling seasons (e.g., summer), block 244 may involve operating the secondary heat pump system 130 to freeze/ solidify the PCM 172 during off-peak hours (e.g., at night), and block 246 may involve rejecting thermal energy from the refrigerant 111 to melt the PCM 172 during peak hours (e.g., during the day), thereby increasing the efficiency of the primary heat pump system 120 during the warmer daytime hours. As another example, during heating seasons (e.g., winter), block 244 may involve operating the secondary heat pump system 130 to melt the PCM 172 during the warmer daytime hours, and block 246 may involve rejecting heat to the refrigerant 111 to freeze/solidify the PCM 172 during the colder nighttime hours, thereby increasing the efficiency of the primary heat pump system 120 at night.

As noted above, in certain embodiments, the system 100 may include plural PCM tanks, such as a first PCM tank 170 storing a first PCM 172 and a second PCM tank 170' storing a second PCM 172', and the first PCM 172 and the second PCM 172' may have different melt/freeze temperatures. For example, the first PCM 172 may be a "cold" PCM with a relatively low melt/freeze temperature (e.g., between 40° F. and 50° F.), and the second PCM 172' may be a "hot" PCM with a relatively high melt/freeze temperature (e.g., between 100° F. and 120° F.). In such forms, the PCM tanks 170, 170' may be connected with different lanes of the facility loop 110 such that the first PCM tank 170 is operable to serve as a heat sink for cooling operations at the site 80 (e.g., cooling of one or more building zones 91A, 91B, cooling fan coils, etc.) while the second PCM tank 170' is operable to serve as a heat source for heating operations at the site 80 (e.g., domestic hot water, snow melting, pools, etc.).

Block 240 may further involve block 248, which generally involves operating the geothermal ground loop 180 to transfer thermal energy between the facility loop refrigerant 111 and the earth in which the ground loop 180 is buried. In certain embodiments, block 248 may involve limiting operation of the geothermal ground loop 180 to peak demand times, during which the thermal energy storage system 106 may be unable to keep up with the demand of the building 90.

As noted above, certain conventional hybrid geothermal systems utilize boilers and/or cooling towers to supplement the heating and/or cooling provided by the geothermal loop. In the current HVAC system 100, however, the need for such boilers and/or cooling towers may be obviated by the use of the secondary heat pump system 130, which heats and cools the facility loop 110 in lieu of the boiler and chiller (e.g. cooling tower) performing this function. In certain embodiments, the installed system 100 may lack a boiler. In certain embodiments, the installed system 100 may lack a chiller. In certain embodiments, the installed system may lack a geothermal ground loop.

In conventional hybrid systems, the geothermal loop is utilized as the primary source of heating and cooling, and the boilers and/or cooling towers are provided to supplement the heating and cooling provided by the geothermal loop. As a result, the geothermal loop must be relatively large, which can be prohibitive in terms of the first costs and the space required to install such a loop. In the current system 100 and process 200, by contrast, the secondary heat pump system 130 is sized for base load heating and cooling in block 224, and the ground loop 180 (when present) is sized (e.g., in block 228) to augment the heating/cooling provided by the secondary heat pump system 130 (e.g., for peak heating/cooling demand times). This allows the air-source heat pump system 130 to bear the majority of the heating/cooling burden, particularly when ambient outside temperatures are conducive. For example, during the spring and fall, ambient outside temperatures are often mild and in the range of 40° F. to 80° F., which is generally comparable to temperatures that would be experienced by the bore field 180. As such, operating the secondary heat pump system 130 may be performed with similar efficiency as operating the bore field 180, with significantly lower first costs.

The added thermal reservoir provided by the thermal energy storage system 106 may further aid in promoting the efficiency of the system 100 and reducing the size of the geothermal ground loop 180, or even eliminating the need for the ground loop 180. During summer months, when the temperature of the ambient air 82 is higher and more cooling is desired during daytime hours, the secondary heat pump system 130 may operate during nighttime hours in block 244, even when the temperature within the building 90 has satisfied its set-point. During nighttime hours, the temperatures are typically 15° F. to 20° F. cooler, and better mimic conditions in the ground loop 180 such that the efficiency of the secondary heat pump system 130 is increased. The cooling during nighttime hours serves to cool the stored water 162 and/or the PCM 172, and in certain embodiments may cause the PCM 172 to freeze or solidify. The cooled water 162 and/or cooled (and possibly frozen/solidified) PCM 172 are then used as a heat sink during daytime hours to provide more efficient cooling in block 246. Thus, the air-to-water secondary heat pump system 130 may be run at night when it is 65° F. to 80° F. outside rather than during the day when it is 80° F. to 95° F. outside. Many geothermal ground loops operate in the 65° F. to 80° F. range during the summer. As such, running the air-source secondary heat pump system 130 at night is practically as efficient and operating the geothermal ground loop 180.

During the winter when the temperature of the ambient air 82 is lower, the air-to-water secondary heat pump system 130 should operate during the day when outside temperatures are higher. In other words, block 244 may involve operating the ATW heat pumps 131 during the day when it is 25° F. to 40° F. outside rather than at night when it is 10° F. to 25° F. outside. The thermal energy provided to the thermal energy storage system 106 during the daytime hours can then be transferred to the facility loop 110 during nighttime hours in block 246. ATW heat pump technology has improved such that it can efficiently operate at lower outside temperatures than in years and decades past. While running such equipment at 25° F. to 40° F. is slightly less efficient than using the ground loop 180 at 40° F. to 55° F. during the winter, the first-cost savings may nonetheless be sufficient to warrant reducing the size of the ground loop 180 or eliminating the ground loop 180 altogether. For extremely cold winter days, the facility loop 110 may include electric heat that trickle-charges during the day and night, to supplement the secondary heat pump system 130 in the event that the secondary heat pump system 130 cannot keep up with the heating load. Thus, block 240 may involve operating an electric heater to aid in raising the temperature of the facility loop refrigerant 111 during peak heating conditions.

Another advantage in adding the thermal energy storage system 106 to the system 100 is that, unlike conventional HVAC systems, the air-to-water secondary heat pump system 130 does not have to be sized for instantaneous heating and cooling needs. Instead, the size selected in block 224 can be significantly reduced so that a smaller secondary heat pump system 130 is run for a longer period of time in block 244. For example, if the building 90 would normally have 50 tons of air conditioning capacity, block 222 may involve sizing the primary heat pump system 120 at 50 tons capacity while block 224 involves sizing the secondary heat pump system 130 at just 10 tons capacity. The 10-ton secondary heat pump system 130 can operate all night long (e.g., in block 224) rather than have a 50-ton outdoor unit that turns on and off several times during the day to meet real-time cooling loads. This down-sizing of equipment may further reduce the first cost of the super-hybrid HVAC system 100 relative to a conventional ground loop. It may also reduce the peak electric demand charges from the utility by having smaller equipment. As demand charges can easily represent 50% or more of monthly utility bills, the reduction in peak demand, may represent a significant advantage.

As noted above, certain embodiments of the thermal energy storage system 106 may include a water storage tank 160 having stored therein a thermal energy storage medium in the form of water 162, which is often the most cost-effective thermal energy storage medium. Indeed, water energy storage is one of the main benefits of conventional geothermal ground loops. Inside the ground loops are water, and the volume/mass of this water is significant on a per ton of heating/cooling basis. For example, a ground loop is typically sized at 200-300 feet per ton of cooling, and loop piping is typically at least 1 inch in diameter. Moreover, the facility loop that connects the ground loop to the zone heat pumps means an even greater volume/mass of water in the system. However, one does not need to install an expensive ground loop 180 to gain the benefits of the same water volume/mass. Indeed, the current system 100 may additionally or alternatively store the water 162 in one or more large water tanks 160, which may be more cost-effective than storing water in a ground loop 180 that needs to be excavated and installed. In certain forms, the water tank(s) 160 may have a capacity of 100 gallons or more. In certain forms, the water tank(s) may have a capacity of 500 gallons or more.

As also noted above, certain embodiments of the thermal energy storage system 106 may include a PCM tank 170 having stored therein a thermal energy storage medium in the form of a PCM 172, and may further include a second PCM tank 170' having stored therein a second PCM 172'. Phase change materials can typically store significantly more energy per volume/mass unit than water 162. While water can be a PCM at 32° F., the disadvantage of ice-storage systems is the high energy cost required to freeze water at such a low temperature. Other types of PCM are becoming available that can be formulated to melt/freeze at almost any desired melt/freeze temperature. For example, a PCM with a melt/freeze point of 70° F. would require relatively little energy to heat or cool to the designated melt/freeze temperature. While the first PCM 172, and/or the second PCM 172' may be more expensive than water, the economics are trending toward PCMs becoming more cost-effective. This is especially true when considering the smaller space and size requirements compared to water energy storage.

In embodiments in which the first PCM 172 and/or the second PCM 172' is used for thermal energy storage, the control system 150 may be programmed to cycle through the melt/freeze point of the first PCM 172 and/or the second PCM 172' every day to maximize the benefit of the phase-changing properties of the PCMs 172, 172'. For example, if the melt/freeze point of the hot PCM 172' is 70° F., then the refrigerant 111 of the loop 110 may melt the PCM 172' during the day as the PCM 172' absorbs heat in block 246. At night, the secondary heat pump system 130 will run and cool the loop 110 again until the PCM 172' freezes and is ready for the cooling needs of the next day, such that the PCM 172' may serve as a heat sink for the facility loop 110 during performance of block 240 during the following day. As described herein, it is also contemplated that the melt/freeze cycle of the PCM may occur over periods longer than a day, such as on a weekly or seasonal basis.

While other control strategies may be utilized, two control methods have shown particular promise in the charging and discharging of the PCM tank 170. A first control strategy involves fully charging the PCM 172 each time period (e.g., each day or week), while a second control strategy involves fully discharging the PCM 172 each time period (e.g., each day or week). These strategies, respectively referred to herein as the "full charge" strategy and the "full discharge" strategy, will now be described with respect to the first PCM tank 170 and the first PCM 172. It should be appreciated, however, that similar control strategies may be utilized in connection with the second PCM tank 170' and the second PCM 172'.

The full charge strategy generally involves fully charging the PCM 172 each time period, such as each day or each week. For example, during cooling-dominated time periods (e.g., summer months), the PCM 172 may be fully charged by freezing substantially all of the PCM 172 in the tank 170 during off-peak hours, such as nighttime hours. When cooling is needed the following day, heat can be discharged to the frozen PCM 172 as needed to thereby melt the PCM 172. Should the total heat transfer requirement of the day fall below the thermal capacity of the frozen PCM 172, a certain percentage (e.g., 15%) of the PCM 172 may remain frozen. The following night, the PCM 172 may be fully frozen again in order to prepare the PCM tank 170 for the cooling needs of the following day.

The full discharge strategy generally involves fully discharging the PCM 172 each time period, such as each day or each week. For example, during cooling-dominated time periods (e.g., summer months), the PCM 172 may be fully discharged by melting substantially all of the PCM 172 in the tank 170 during the peak daytime heating hours. That night, the PCM 172 is partially charged based upon a projected heating load for the following day. The projected heating load may, for example, be based upon one or more performance-related criteria projected for the following day, such as projected occupancy, projected weather (including precipitation, humidity, and/or temperature), projected sunlight exposure, and/or other criteria. For example, a greater percentage of the PCM 172 may be frozen on the night before a projected high-occupancy day than on the night before a projected low-occupancy day.

The full discharge control strategy may take into account the intended use of the building 90 in making such decisions. As one example, if the building 90 is an office building that is primarily occupied on weekdays, the control system 150 may operate the secondary heat pump system 130 to cause a higher percentage of the PCM 172 to be frozen on Sunday through Thursday nights for use during higher-occupancy Monday through Friday daytime hours, and a lower percentage of the PCM 172 to be frozen on Friday and Saturday nights for use during lower-occupancy Saturday and Sunday daytime hours. Conversely, if the building 90 is a place of worship that is primarily occupied on weekends, the control system 150 may operate the secondary heat pump system 130 to cause a lower percentage of the PCM 172 to be frozen on Sunday through Thursday nights for use during low-occupancy Monday through Friday daytime hours, and a higher percentage of the PCM 172 to be frozen on Friday and Saturday nights for use during higher-occupancy Saturday and Sunday daytime hours. As described herein, the control system 150 may utilize machine learning to provide more accurate future results based on past performances.

While the above examples are described with reference to the charging of the PCM 172 involving freezing the PCM 172, it should be appreciated that charging the PCM 172 may also refer to melting the PCM 172. More particularly, when the PCM 172 is intended to be used as a heat sink during peak hours, charging the PCM 172 may involve freezing the PCM 172, and discharging the PCM 172 may involve melting the PCM 172. Conversely, when the PCM 172 is intended to be used as a heat source during peak hours, charging the PCM 172 may involve melting the PCM 172, and discharging the PCM 172 may involve freezing the PCM 172. Those skilled in the art will readily understand how the above-mentioned control strategies, which have been described with reference to utilizing the PCM 172 as a heat sink during peak hours, can readily be adapted to those situations in which the PCM 172 is to be utilized as a heat source during peak hours.

As should be appreciated, as the thermal energy storage capacity of the thermal energy storage system 106 rises, the need for a ground loop 180 diminishes. For example, if there is enough thermal energy storage capacity in the thermal energy storage system 106, the HVAC system 100 can not only coast from day to night and night to day, but in certain cases from season to season. The thermal energy storage medium (e.g., water 162 and/or PCM 172) would be accepting thermal energy during the cooling hours and/or seasons, which thermal energy would be used as a heat source for the heating hours and/or seasons. Conversely, the thermal energy storage medium (e.g., water 162 and/or PCM 172) would reject thermal energy during the heating hours and/or seasons, and be used as a heat sink for the cooling hours and/or seasons.

Should the thermal energy storage provided by the thermal energy storage system 106 be sufficient, the ground loop 180 may be eliminated. If deemed desirable or necessary, however, the ground loop 180 may be provided as a relatively small ground loop. In such forms, block 228 may involve sizing the ground loop 180 to supplement the heating/cooling of the secondary heat pump system 130 for peak load conditions only, rather than sizing the secondary heat pump system 130 to supplement the heating and/or cooling of the ground loop 180. As noted above, peak load days are relatively infrequent, and so the size in capacity of the ground loop 180 can usually be limited to just 10% to 20% of the overall building load. Another advantage with just a 10% to 20% ground loop is that this would open up many more markets for a super-hybrid system 100 where there is a limited amount of ground space. For example, most commercial chains with hundreds or even thousands of locations only have enough land for a building and parking lot. A super-hybrid system with only a 10% to 20% capacity ground loop 180 could make geothermal more feasible for such chains.

In order to maximize the benefit of this combination of an air-to-water heat pump system 130 and thermal energy storage system 106, the control system 150 may utilize weather forecast information (e.g., from the weather forecast service 156) during block 240 so that the outside temperature and time at which the secondary heat pump system 130 runs is optimized in block 244. For example, rather than just assuming the secondary heat pump system 130 should start cooling the facility loop 110 on a particular night at 9 PM during the summer for optimal energy efficiency, it could be better to wait for a cool front to move in the next day at 9 AM depending on the weather forecast. When possible, the secondary heat pump system 130 should run when the outside conditions are best within a given time period to balance the ideal loop temperature against the outside temperature and time it will need to run. Similar control logic may apply when a warm front moves in during the heating season. Additionally, a monthly recommended loop temperature schedule may provide upper and lower temperature set-points so that the control system 150 knows when to turn the secondary heat pump system 130 on and off without over-cooling or over-heating the loop 110.

In embodiments in which the system 100 is entirely electrical, no fossil fuels (e.g., natural gas) are burned onsite. It should also be noted that by moving away from gas-fired heating equipment (e.g., boilers), and moving toward a fully-electric system 100, the simple addition of solar photovoltaic (PV) cells 84 can reduce the energy requirements of the site 80, and may aid in providing the building 90 as a net zero energy facility. While solar PV can also be added to inefficient conventional HVAC systems, such systems would require much more PV to achieve net zero energy. There is thus presented the opportunity to minimize the electric load of the HVAC system 100 so that the size of the PV system 84 can be minimized. Not all rooftops have the space/area for both conventional HVAC equipment and solar PV. But a facility loop along the lines set forth herein will both free up space on the roof for PV cells and minimize the need for such a PV system 84.

As noted above, peak demand charges can represent a significant portion of an energy bill for a facility. In certain embodiments, the control system 150 may control the discharging of the first PCM 172 and/or the second PCM 172' to reduce the peak demand usage of the site 80. For example, if the site 80 is projected to require the most amount of electrical power during a particular timeframe, the control system 150 may control the secondary heat pump system 130 to discharge the appropriate PCM 172/172' during that timeframe. Such discharging of the PCM 172/172' during the timeframe of peak demand for the site 80 reduces the load on the primary heat pump system 120, and thereby reduces the contributions of the HVAC system 100 to the peak demand. Such a peak demand shaving strategy may aid in reducing the energy bills for the site 80.

With additional reference to FIG. 8, an exemplary process 300 that may be performed using the example HVAC system 100 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 300 may be performed wholly by the control system 150, or that the blocks may be distributed among one or more of the elements and/or additional devices, parties, and/or systems that are not specifically illustrated in FIGS. 1-5. Additionally, while the blocks are illustrated in a relatively serial fashion, it is to be understood that two or more of the blocks may be performed concurrently or in parallel with one another.

The process 300 generally includes determining a charge level for the thermal energy storage system 106 in block 310, charging the thermal energy storage system 106 in block 320, discharging the thermal energy storage system 106 in block 330, and updating one or more heating/cooling parameters in block 340. As described herein, the process 300 may be an iterative process in which the blocks 310, 320, 330, 340 are iterated over the course of days, weeks, months, seasons, or years.

The process 300 includes block 310, which generally involves determining a charge level for the thermal energy storage system 106. The determining of block 310 may be based at least in part upon one or more criteria, such as projected occupancy for the building 80, projected set-points within the building, and/or projected weather information (e.g., projected temperature, projected humidity, projected precipitation, and/or projected sun exposure). One or more of the criteria may be assigned a corresponding weight factor, and the determining of block 310 may involve evaluating the various criteria according to their weight factor. In certain embodiments, the determining of block 310 may be performed at least in part by the neural network 158.

The process 300 includes block 320, which generally involves charging the thermal energy storage system 106 based upon the charge level determined in block 310. In certain forms, block 320 may involve operating the secondary heat pump system 130 to transfer thermal energy between the outdoor medium and the thermal energy storage system 106 such that the thermal energy storage system 106 can be used as a heat source/sink during subsequent operation of the primary heat pump system 120. Additionally or alternatively, block 320 may involve operating the above-described tertiary heat pump system to freeze/solidify the cold PCM 172 while melting the hot PCM 172' to thereby simultaneously charge both PCM tanks 170, 170'. Block 320 is generally performed during a first recurring time period, such as daily off-peak hours.

In the illustrated form, block 320 involves charging the thermal energy storage system 106 based upon a projected heating/cooling load for the primary heat pump system 120 in a second time period subsequent to the first time period. As noted above, this projected heating/cooling load may be based upon one or more criteria, such as projected occupancy of the building 80 during the second time period and/or projected weather (e.g., projected sunlight exposure, projected humidity, and/or projected precipitation) during the second time period. As will be appreciated, the projected weather information may, for example, be received from the weather forecast service 156.

The process 300 also includes block 330, which generally involves discharging the thermal energy storage system 106. More particularly, block 330 involves utilizing the thermal energy storage system 106 as a heat source/sink for the primary heat pump system 120 as the primary heat pump system 120 operates according to the demand of the building 90. As one example, the primary heat pump system 120 may utilize the cold PCM 172 as a heat sink for one or more cooling operations, thereby melting at least a portion of the cold PCM 172. As another example, the primary heat pump system 120 may utilize the hot PCM 172' as a heat source for one or more heating operations, thereby freezing at least a portion of the hot PCM 172'. Those skilled in the art will readily recognize that the facility loop refrigerant acts as an intermediary to transfer the thermal energy between the PCM tank(s) and the primary heat pump system 120 as the refrigerant is pumped through the facility loop 110 by the pump package 140.

The process 300 further includes block 340, which generally involves updating one or more heating/cooling parameters based upon performance of the system 100 during the second time period. Block 320 may, for example, be performed to update the artificial neural network 158. By way of example, block 340 may involve updating a weight applied to one or more of the criteria evaluated in block 320, or may involve updating the criteria themselves. Further details regarding examples of this updating of parameters are described below. Upon completing block 340, the process 300 may return to block 320, in which the thermal energy storage system 106 is again charged. The second iteration of block 320 may be performed during a second iteration of the first recurring time period, and be based upon the parameters as updated in block 340 and projected performance of the system 100 during a second iteration of the second recurring time period.

Certain example use case scenarios will now be described with reference to the process 300. It should be understood that these example use case scenarios are provided to illustrate particular implementations of the process 300, and should not be construed as limiting the scope of the described process 300.

In an example use case scenario, the control system 150 projects on Monday afternoon that the building 90 will be occupied to 60% occupancy on Tuesday. Based upon this projection (and optionally one or more other factors, such as the projected weather for Tuesday), the control system 150 determines that the PCM tank 170 should be charged to 40% capacity (e.g., by freezing 40% of the PCM 172) in block 310. Accordingly, the PCM tank 170 is charged to 40% capacity in block 320. Following Tuesday's cooling operations in block 330, 10% of the PCM 172 remains frozen, indicating that the PCM tank 172 was overcharged on Monday night, which may indicate an inefficiency such as excessive use of power during the off-peak charging hours. In an effort to reduce these inefficiencies, the neural network 158 performs one or more graduated actions in block 340 to adjust one or more parameters, such as the weight given to the occupancy in determining the cooling load. In the following iteration of block 310, the control system 150 utilizes these updated parameters and determines that the PCM tank 170 should be charged to 35% capacity on Tuesday night. All other things being equal on Wednesday, a lesser percentage of PCM 172 remains frozen at the conclusion of the day, which indicates a lower degree of "overcharge" and less energy waste.

In addition or as an alternative to reducing the charge to be applied to the thermal energy storage system 106 on Tuesday night, the control system 106 may make changes to the projections for the following Monday. For example, if it is determined that the occupancy of the building 80 was in fact only 50% on Monday, the neural network 158 may perform one or more graduated actions to reduce the occupancy projections for Tuesday and/or the following Monday. For example, the neural network 158 may take one or more graduated actions that result in the occupancy for the following Monday being projected at only 55%. In such a case, an iteration of block 310 performed on Sunday may involve determining the charge to be applied to the thermal energy storage system 106 on Sunday night based upon the 55% occupancy projection for the second Monday.

Referring now to FIG. 9, a simplified block diagram of at least one embodiment of a computing device 400 is shown. The illustrative computing device 400 depicts at least one embodiment of a controller that may be utilized in connection with the control system 150 illustrated in FIGS. 1 and 5.

Depending on the particular embodiment, the computing device 400 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 400 includes a processing device 402 that executes algorithms and/or processes data in accordance with operating logic 408, an input/output device 404 that enables communication between the computing device 400 and one or more external devices 410, and memory 406 which stores, for example, data received from the external device 410 via the input/output device 404.

The input/output device 404 allows the computing device 400 to communicate with the external device 410. For example, the input/output device 404 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 400. The input/output device 404 may include hardware, software, and/or firmware suitable for performing the techniques described herein.

The external device 410 may be any type of device that allows data to be inputted or outputted from the computing device 400. For example, in various embodiments, the external device 410 may be embodied as the primary heat pump system 120, the secondary heat pump system 130, the pump package 140, a temperature sensor of the temperature sensor array 151, the weather forecast service 156, or a valve of the valve system 190. Further, in some embodiments, the external device 410 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 410 may be integrated into the computing device 400.

The processing device 402 may be embodied as any type of processor(s) capable of performing the functions described herein. In particular, the processing device 402 may be embodied as one or more single or multi-core processors, microcontrollers, or other processor or processing/controlling circuits. For example, in some embodiments, the processing device 402 may include or be embodied as an arithmetic logic unit (ALU), central processing unit (CPU), digital signal processor (DSP), and/or another suitable processor(s). The processing device 402 may be a programmable type, a dedicated hardwired state machine, or a combination thereof. Processing devices 402 with multiple processing units may utilize distributed, pipelined, and/or parallel processing in various embodiments. Further, the processing device 402 may be dedicated to performance of just the operations described herein, or may be utilized in one or more additional applications. In the illustrative embodiment, the processing device 402 is of a programmable variety that executes algorithms and/or processes data in accordance with operating logic 408 as defined by programming instructions (such as software or firmware) stored in memory 406. Additionally or alternatively, the operating logic 408 for processing device 402 may be at least partially defined by hardwired logic or other hardware. Further, the processing device 402 may include one or more components of any type suitable to process the signals received from input/output device 404 or from other components or devices and to provide desired output signals. Such components may include digital circuitry, analog circuitry, or a combination thereof.

The memory 406 may be of one or more types of non-transitory computer-readable media, such as a solid-state memory, electromagnetic memory, optical memory, or a combination thereof. Furthermore, the memory 406 may be volatile and/or nonvolatile and, in some embodiments, some or all of the memory 406 may be of a portable variety, such as a disk, tape, memory stick, cartridge, and/or other suitable portable memory. In operation, the memory 406 may store various data and software used during operation of the computing device 400 such as operating systems, applications, programs, libraries, and drivers. It should be appreciated that the memory 406 may store data that is manipulated by the operating logic 408 of processing device 402, such as, for example, data representative of signals received from and/or sent to the input/output device 404 in addition to or in lieu of storing programming instructions defining operating logic 408. As illustrated, the memory 406 may be included with the processing device 402 and/or coupled to the processing device 402 depending on the particular embodiment. For example, in some embodiments, the processing device 402, the memory 406, and/or other components of the computing device 400 may form a portion of a system-on-a-chip (SoC) and be incorporated on a single integrated circuit chip.

In some embodiments, various components of the computing device 400 (e.g., the processing device 402 and the memory 406) may be communicatively coupled via an input/output subsystem, which may be embodied as circuitry and/or components to facilitate input/output operations with the processing device 402, the memory 406, and other components of the computing device 400. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 400 may include other or additional components, such as those commonly found in a typical computing device (e.g., various input/output devices and/or other components), in other embodiments. It should be further appreciated that one or more of the components of the computing device 400 described herein may be distributed across multiple computing devices. In other words, the techniques described herein may be employed by a computing system that includes one or more computing devices. Additionally, although only a single processing device 402, I/O device 404, and memory 406 are illustratively shown in FIG. 9, it should be appreciated that a particular computing device 400 may include multiple processing devices 402, I/O devices 404, and/or memories 406 in other embodiments. Further, in some embodiments, more than one external device 410 may be in communication with the computing device 400.

Figure 10:
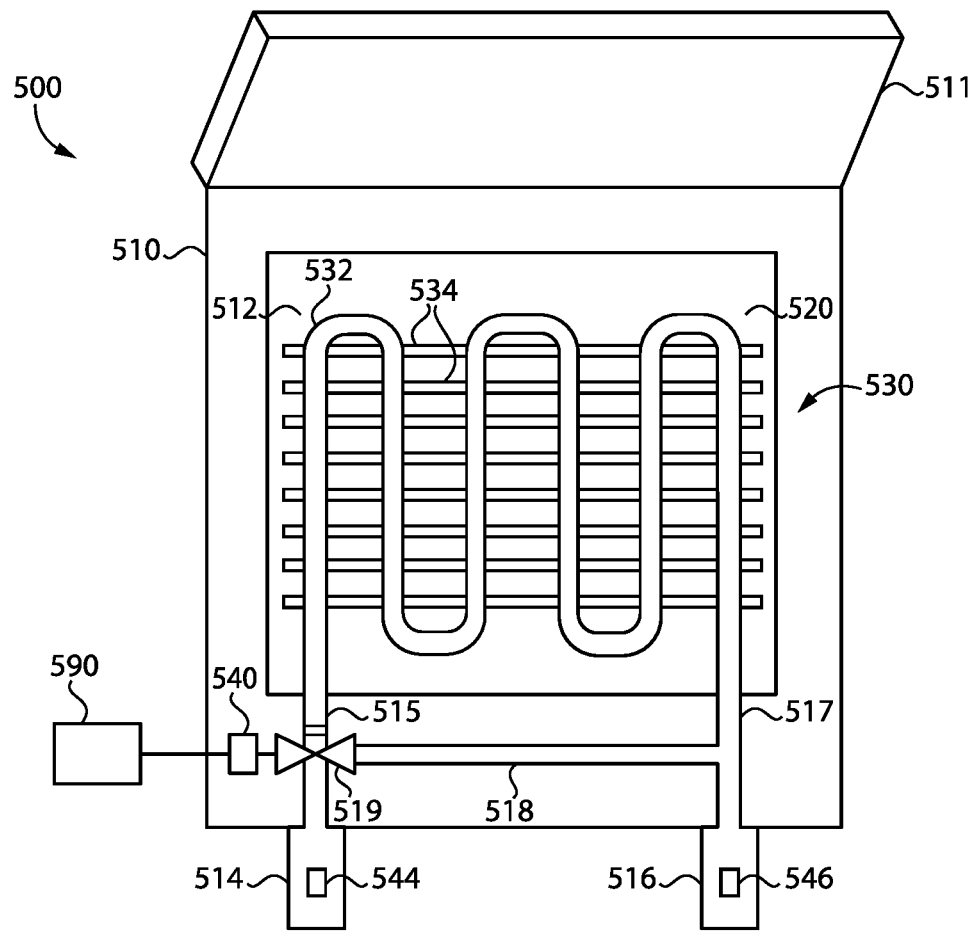
FIG. 10 is a schematic plan view of a modular thermal energy storage device according to certain embodiments.

With additional reference to FIG. 10, illustrated therein is a modular thermal energy storage device 500 according to certain embodiments. The modular thermal energy storage device 500 may, for example, be utilized in the HVAC system 100 as the PCM tank 170 and/or the PCM tank 170'. The modular thermal energy storage device 500 generally includes a tank 510 having a PCM 520 stored therein, and a heat exchanger 530 disposed in the PCM 520. The modular thermal energy storage device 500 may further include a controller 540 and/or be in communication with an external device 590, such as the control system 150.

The tank 510 includes a plurality of insulated walls that define a cavity 512 in which the PCM 520 and the heat exchanger 530 are positioned, and a lid 511 operable to cover the cavity 512. An inlet port 514 is connected with an inlet end of the heat exchanger 530 via an inlet pipe 515, and an outlet port 516 is connected with an outlet end of the heat exchanger 530 via an outlet pipe 517. The inlet port 514 and the outlet port 516 are configured to place the device 500 in fluid communication with a refrigerant line (e.g., the facility loop 110) such that refrigerant from the line can be directed through the heat exchanger 530. The inlet port 514 and/or the outlet port 516 may, for example, comprise quick plumbing connections that facilitate connection of the device 500 to the refrigerant line (e.g., the facility loop 110). In certain embodiments, the tank 510 may further include a bypass line 518 that is connected with the inlet pipe 515 via a bypass valve 519 such that at least a portion of fluid flowing through the inlet pipe 515 can be diverted to the outlet pipe 517 without first passing through the heat exchanger 530. The bypass valve 519 may be in communication with the controller 540 and/or the external device 590 such that the controller 540 and/or the external device 590 is operable to control operation of the bypass valve 519 to selectively divert at least a portion of the refrigerant through the bypass line 518.

The PCM 520 has a designated melt/freeze temperature and may, for example, take the form of a paraffin, a lipid, a salt hydrate, or another form of phase change material. In certain embodiments, the melt/freeze temperature of the PCM 520 may be between 40° F. and 120° F. The melt/freeze temperature of the PCM 520 may be selected according to the intended use of the modular thermal energy storage device 500. For example, in embodiments in which the device 500 is intended for use as a cold PCM tank (e.g., the cold PCM tank 170), the melt/freeze temperature of the PCM 520 may be between 40° F. and 50° F. As another example, in embodiments in which the device 500 is intended for use as a hot PCM tank (e.g., the hot PCM tank 170'), the melt/freeze temperature of the PCM 520 may be between 100° F. and 120° F. As a further example, the melt/freeze temperature of the PCM 520 may be between 60° F. and 70° F.

The heat exchanger 530 generally includes a pipe 532 having an inlet end connected with the inlet pipe 515 and an outlet end connected with the outlet pipe 517, and a plurality of fins 534 that increase the surface area through which the heat exchanger 530 is operable to exchange heat between the PCM 520 and the fluid flowing through the pipe 530.

In embodiments that include the controller 540, the controller 540 may be in communication with an external device 590 (e.g., the control system 150). It is also contemplated that the controller 540 may not necessarily be in communication with the external device 590, and may operate the device 500 as a standalone device. In certain embodiments, an inlet temperature sensor 544 may be placed at the inlet port 514 and/or an outlet temperature sensor 546 may be placed at the outlet port 516 to monitor the temperature of the refrigerant entering and/or leaving the device 500. The temperature sensor(s) 544, 546 may be in communication with the controller 540 and/or the external device 590 such that the controller 540 and/or the external device 590 is operable to control operation of the device 500 based at least in part upon information received from the temperature sensor(s) 544, 546.

Certain embodiments of the present application relate to a method, comprising: operating a heating, ventilation, and air conditioning (HVAC) system to transfer thermal energy between an outdoor medium and an indoor medium; wherein the HVAC system is located at a site comprising a facility, and wherein the HVAC system comprises: a primary heat pump system having a primary heat pump system size; a secondary heat pump system having a secondary heat pump system size less than the primary heat pump system size; and a thermal energy storage system having a thermal energy storage system size, the thermal energy storage system comprising a phase change material configured to transition between a solid phase and a liquid phase at a designated melt/freeze temperature; wherein operating the HVAC system comprises: operating the secondary heat pump system during a first time period, thereby transferring thermal energy between the outdoor medium and the thermal energy storage system and transitioning at least a portion of the phase change material from a first phase to a second phase; and operating the primary heat pump system according to demand of the facility, thereby transferring thermal energy between the indoor medium and the thermal energy storage system according to the demand; and wherein, during operation of the primary heat pump system during a second time period different from the first time period, the thermal energy storage system acts as a heat source/sink for operation of the primary heat pump system as at least a portion of the phase change material transitions from the second phase to the first phase.

In certain embodiments, the method further comprises installing the HVAC system to the site, wherein installing the HVAC system comprises: installing the primary heat pump system to the site; installing a secondary heat pump system to the site; and installing the thermal energy storage system to the site.

In certain embodiments, installing the primary heat pump system comprises placing the primary heat pump system in thermal communication with the indoor medium and a facility loop comprising a facility loop refrigerant such that the primary heat pump system is operable to transfer thermal energy between the indoor medium and the facility loop refrigerant; wherein installing the secondary heat pump system comprises placing the secondary heat pump system in thermal communication with the outdoor medium and the facility loop such that the secondary heat pump system is operable to transfer thermal energy between the outdoor medium and the facility loop refrigerant; and wherein installing the thermal energy storage system comprises placing the phase change material in thermal communication with the facility loop such that the thermal energy storage system is operable to transfer thermal energy between the phase change material and the facility loop refrigerant.

In certain embodiments, the method further comprises: determining a heating/cooling load for the facility; and sizing the HVAC system, wherein sizing the HVAC system comprises: sizing the primary heat pump system based upon to the heating/cooling load for the facility, wherein sizing the primary heat pump system comprises selecting the primary heat pump system size corresponding to the heating/cooling load for the facility; sizing the secondary heat pump system based upon to the heating/cooling load for the facility, wherein sizing the secondary heat pump system comprises selecting the secondary heat pump system size less than the heating/cooling load for the facility; and sizing the thermal energy storage system, wherein sizing the thermal energy storage system comprises selecting the thermal energy storage system size such that the thermal energy storage system is operable to act as the sink/source for operation of the primary heat pump system during the second time period.

In certain embodiments, the method further comprises: selecting a geothermal ground loop size based upon the primary heat pump system size and the secondary heat pump system size; installing a geothermal ground loop having the geothermal ground loop size to the site; placing the geothermal ground loop in thermal communication with the thermal energy storage system; and operating the geothermal ground loop to transfer thermal energy between the thermal energy storage system and earth In certain embodiments, the geothermal ground loop size is no greater than 25% of the heating/cooling load for the facility.

In certain embodiments, operating the geothermal ground loop comprises limiting operation of the geothermal ground loop to peak load time periods.

In certain embodiments, the thermal energy storage system size it at least five ton-hours.

In certain embodiments, the thermal energy storage system size it at least ten ton-hours.

In certain embodiments, the method further comprises limiting operation of the secondary heat pump system to the first time period.

In certain embodiments, the first time period corresponds to off-peak hours, and wherein the second time period corresponds to peak hours.

In certain embodiments, the method further comprises selecting the first time period based upon a weather forecast.

In certain embodiments, the HVAC system does not comprise a boiler.

In certain embodiments, the HVAC system does not comprise a chiller.

In certain embodiments, the HVAC system does not comprise a ground loop.

In certain embodiments, the secondary heat pump system size is no more than half a heating/cooling load of the facility.

In certain embodiments, the designated melt/freeze temperature is between 40° F. and 120° F.

In certain embodiments, the designated melt/freeze temperature is between 50° F. and 80° F.

In certain embodiments, the secondary heat pump system is an air-to-water heat pump system, and wherein the outdoor medium is ambient air.

Certain embodiments of the present application relate to a heating, ventilation, and air conditioning (HVAC) system for a facility, the HVAC system comprising: a thermal energy storage system; a primary heat pump system having a primary heat pump system size, wherein the primary heat pump system is in thermal communication with the thermal energy storage system and an indoor medium; a secondary heat pump system having a secondary heat pump system size less than the primary heat pump system size, wherein the secondary heat pump system is in thermal communication with the thermal energy storage system and an outdoor medium; and a control system operable to control operation of the primary heat pump system and the secondary heat pump system, wherein the control system is configured to: operate the primary heat pump system according to demand of the facility; and limit operation of the secondary heat pump system to a first time period; wherein operation of the secondary heat pump system transfers thermal energy between the thermal energy storage system and the outdoor medium to thereby charge the thermal energy storage system during the first time period; and wherein operation of the primary heat pump system transfers thermal energy between the thermal energy storage system and the indoor medium to thereby discharge the thermal energy storage system.

In certain embodiments, the secondary heat pump system comprises an air-to-water heat pump, and wherein the outdoor medium is ambient air.

In certain embodiments, the control system is configured to select the first time period based upon a weather forecast.

In certain embodiments, the control system is configured to select the first time period based upon a projected cost of operating the secondary heat pump system at the first time period being less than a projected cost of operating the secondary heat pump system at a second time period different from the first time period.

In certain embodiments, the first time period corresponds to off-peak hours.

In certain embodiments, the thermal energy storage system comprises at least one hundred gallons of water, and wherein the water is stored in a water tank.

In certain embodiments, the water stored in the water tank is in fluid communication with the primary heat pump system.

In certain embodiments, the thermal energy storage system comprises a phase change material that transitions between a solid phase and a liquid phase at a designated melt/freeze temperature, and wherein the designated melt/freeze temperature is between 40° F. and 120° F.

In certain embodiments, the thermal energy storage system comprises a phase change material that transitions between a solid phase and a liquid phase at a designated melt/freeze temperature, and wherein the designated temperature is between 50° F. and 80° F.

In certain embodiments, the HVAC system does not comprise a boiler.

In certain embodiments, the HVAC system does not comprise a chiller.

In certain embodiments, the HVAC system does not comprise a ground loop.

In certain embodiments, the secondary heat pump system size is less than one half the primary heat pump system size.

In certain embodiments, the HVAC system further comprises a geothermal ground loop in thermal communication with the thermal energy storage system such that operation of the geothermal ground loop transfers thermal energy between the thermal energy storage system and earth.

In certain embodiments, the geothermal ground loop has a ground loop size less than 40% of the primary heat pump system size.

In certain embodiments, the geothermal ground loop has a ground loop size less than the secondary heat pump system size.

In certain embodiments, water circulates between the primary heat pump system and the thermal energy storage system to transfer thermal energy between the primary heat pump system and the thermal energy storage system.

In certain embodiments, a thermal capacity of the thermal energy storage system is at least ten ton-hours.

In certain embodiments, the thermal energy storage system comprises: a first phase change material (PCM) tank storing a first PCM, wherein the first PCM is configured to transition between a solid phase and a liquid phase at a first melt/freeze temperature; and a second PCM tank storing a second PCM, wherein the second PCM is configured to transition between the solid phase and the liquid phase at a second melt/freeze temperature; and wherein the first melt/freeze temperature is less than the second melt/freeze temperature.

In certain embodiments, the first melt/freeze temperature is at least 50° F. below the second melt/freeze temperature.

In certain embodiments, the primary heat pump system is configured to utilize the first PCM as a heat sink for a cooling operation; and wherein the primary heat pump system is configured to utilize the second PCM as a heat source for a heating operation.

In certain embodiments, primary heat pump system comprises: a first heat pump configured to transfer thermal energy from the indoor medium to the first PCM during the cooling operation; and a second heat pump configured to transfer thermal energy to the indoor medium from the second PCM during the heating operation.

In certain embodiments, the control system is configured to operate the secondary heat pump system to charge the thermal energy storage system during the first time period based upon a projected heating/cooling load for the primary heat pump system during a second time period subsequent to the first time period.

In certain embodiments, the projected heating/cooling load is based at least in part upon one or more of: a projected occupancy of the facility in the second time period; or a projected weather condition for the second time period.

In certain embodiments, the first time period is a first recurring time period; wherein the second time period is a second recurring time period; and wherein the control system is configured to utilize machine learning to iteratively adapt the charging of the thermal energy storage system during the first recurring time period based upon performance of the primary heat pump system during the second recurring time period.

In certain embodiments, the control system is further configured to project a maximum energy usage timeframe in which the facility is projected to have a peak electrical demand; and wherein the control system is further configured to discharge the thermal energy storage system primarily during the maximum energy usage timeframe to thereby reduce peak demand usage of the facility.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A heating, ventilation, and air conditioning (HVAC) system for a facility, the HVAC system comprising:
    a thermal energy storage system;
    a primary heat pump system having a primary heat pump system size, wherein the primary heat pump system is in thermal communication with the thermal energy storage system and an indoor medium, and wherein the primary heat pump system is configured to transfer thermal energy between the thermal energy storage system and the indoor medium to thereby discharge the thermal energy storage system;
    a secondary heat pump system having a secondary heat pump system size less than the primary heat pump system size, wherein the secondary heat pump system is in thermal communication with the thermal energy storage system and an outdoor medium; and
    a control system operable to control operation of the primary heat pump system and the secondary heat pump system, wherein the control system is configured to:
        operate the primary heat pump system according to demand of the facility; and
        limit operation of the secondary heat pump system to a first time period;
    wherein operation of the secondary heat pump system transfers thermal energy between the thermal energy storage system and the outdoor medium to thereby charge the thermal energy storage system during the first time period.

2. The HVAC system of claim 1, wherein the secondary heat pump system comprises an air-to-water heat pump, and wherein the outdoor medium is ambient air.

3. The HVAC system of claim 1, wherein the control system is configured to select the first time period based upon a weather forecast.

4. The HVAC system of claim 1, wherein the control system is configured to select the first time period based upon a projected cost of operating the secondary heat pump system at the first time period being less than a projected cost of operating the secondary heat pump system at a second time period different from the first time period.

5. The HVAC system of claim 1, wherein the first time period corresponds to off-peak hours.

6. The HVAC system of claim 1, wherein the thermal energy storage system comprises a phase change material that transitions between a solid phase and a liquid phase at a designated melt/freeze temperature.

7. The HVAC system of claim 1, wherein the secondary heat pump system size is less than one half the primary heat pump system size.

8. The HVAC system of claim 1, wherein the thermal energy storage system comprises:
    a first phase change material (PCM) tank storing a first PCM, wherein the first PCM is configured to transition between a solid phase and a liquid phase at a first melt/freeze temperature; and
    a second PCM tank storing a second PCM, wherein the second PCM is configured to transition between the solid phase and the liquid phase at a second melt/freeze temperature; and
    wherein the first melt/freeze temperature is less than the second melt/freeze temperature.

9. The HVAC system of claim 8, wherein the first melt/freeze temperature is at least 50° F. below the second melt/freeze temperature.

10. The HVAC system of claim 8, wherein the primary heat pump system is configured to utilize the first PCM as a heat sink for a cooling operation; and
    wherein the primary heat pump system is configured to utilize the second PCM as a heat source for a heating operation.

11. The HVAC system of claim 10, wherein the primary heat pump system comprises:
    a first heat pump configured to transfer thermal energy from the indoor medium to the first PCM during the cooling operation; and
    a second heat pump configured to transfer thermal energy to the indoor medium from the second PCM during the heating operation.

12. The HVAC system of claim 1, wherein the control system is configured to operate the secondary heat pump system to charge the thermal energy storage system during the first time period based upon a projected heating/cooling load for the primary heat pump system during a second time period subsequent to the first time period.

13. The HVAC system of claim 12, wherein the projected heating/cooling load is based at least in part upon one or more of:
   a projected occupancy of the facility in the second time period; or
   a projected weather condition for the second time period.

14. The HVAC system of claim 1, wherein the control system is further configured to project a maximum energy usage timeframe in which the facility is projected to have a peak electrical demand; and
   wherein the control system is further configured to discharge the thermal energy storage system primarily during the maximum energy usage timeframe to thereby reduce peak demand usage of the facility.

15. The HVAC system of claim 6, wherein the designated melt/freeze temperature is between 40° F. and 120° F.

* * * * *